United States Patent
Taylor et al.

(10) Patent No.: US 10,742,917 B2
(45) Date of Patent: Aug. 11, 2020

(54) PIXEL SENSOR ELEMENT, IMAGE SENSOR, IMAGING DEVICE, AND METHOD

(71) Applicant: SPECIALISED IMAGING LIMITED, Leighton Buzzard (GB)

(72) Inventors: Keith Roger Taylor, Leighton Buzzard (GB); Renato Turchetta, Leighton Buzzard (GB)

(73) Assignee: SPECIALISED IMAGING LIMITED, Leighton Buzzard (GB)

( * ) Notice: Subject to any disclaimer, the term of this patent is extended or adjusted under 35 U.S.C. 154(b) by 0 days.

(21) Appl. No.: 16/618,592

(22) PCT Filed: May 14, 2018

(86) PCT No.: PCT/EP2018/062288
§ 371 (c)(1),
(2) Date: Dec. 2, 2019

(87) PCT Pub. No.: WO2018/219623
PCT Pub. Date: Dec. 6, 2018

(65) Prior Publication Data
US 2020/0162692 A1    May 21, 2020

(30) Foreign Application Priority Data
Jun. 1, 2017 (EP) .................... 17174032

(51) Int. Cl.
*H04N 5/3745* (2011.01)
*H04N 5/3728* (2011.01)
*H04N 5/372* (2011.01)

(52) U.S. Cl.
CPC ....... *H04N 5/37452* (2013.01); *H04N 5/3728* (2013.01); *H04N 5/37206* (2013.01); *H04N 5/37213* (2013.01)

(58) Field of Classification Search
CPC .......... H04N 5/37452; H04N 5/37206; H04N 5/37213; H04N 5/3728
See application file for complete search history.

(56) References Cited

U.S. PATENT DOCUMENTS 5,060,245 A  * 10/1991 Nelson .................. G11C 7/005
                                              257/232
5,355,165 A    11/1994 Kosonocky et al.
(Continued)

FOREIGN PATENT DOCUMENTS

EP   0809393   11/1997
EP   1220319   7/2002

OTHER PUBLICATIONS

Walter F Kosonocky et al, "360 * 360 Element Three-Phase Very High Frame Rate Burst Image Sensor: Design, Operation, and Performance", IEEE Transactions on Electron Devices, IEEE Service Center, Piscataway, NJ, US, vol. 44, No. 10, Oct. 1, 1997 (Oct. 1, 1997), XP011016271.

(Continued)

*Primary Examiner* — Sinh Tran
*Assistant Examiner* — Zhenzhen Wu
(74) *Attorney, Agent, or Firm* — Stephen J. Weyer, Esq.; Stites & Harbison, PLLC

(57) ABSTRACT

A pixel sensor element (200) including a photodetector (201) and a storage assembly having N storage arrays (205), each having an input shift register (207) and an output shift register (215) each with a number M of storage cells arranged in a column, and a storage shift register (211) with a number M of rows of storage cells, each row comprising a number P of storage cells, for signal transfer from the input shift register (207) to the output shift register (215). A number N of independently driveable signal transfer regions (203) transfer the signal from the photodetector (201) to a first cell (210) of one of a respective one of the input shift (Continued)

registers (207). A number N of signal read-out regions (219) read the signal from a last cell (217) of a respective one of the output shift registers (215). N is 2 or more. M is 1 or more. P is 1 or more. Image sensors, imaging devices, storage assemblies, and methods are also provided.

15 Claims, 15 Drawing Sheets

(56) References Cited

U.S. PATENT DOCUMENTS

| | | | |
|---|---|---|---|
| 6,118,483 A | 9/2000 | Etoh | |
| 6,873,361 B1 * | 3/2005 | Etoh | H01L 25/167 |
| | | | 257/E25.006 |
| 7,031,556 B1 | 4/2006 | Etoh | |
| 9,749,565 B2 * | 8/2017 | Barnes | G01S 7/4863 |
| 2010/0182470 A1 * | 7/2010 | Sugawa | H04N 5/374 |
| | | | 348/294 |

OTHER PUBLICATIONS

International Search Report for International Application No. PCT/EP2018/062288, dated Jul. 5, 2018, European Patent Office, Rijswijk, NL.
Written Opinion for International Application No. PCT/EP2018/062288, dated Jul. 5, 2018, European Patent Office, Rijswijk, NL.
Extended European Search Report for Application No. 17174032.7, dated Nov. 14, 2017, Intellectual Property Office, European Patent Office Rijswik, NL.

* cited by examiner

PIXEL SENSOR ELEMENT, IMAGE SENSOR, IMAGING DEVICE, AND METHOD

The present invention is directed towards pixel sensor elements for generation of a signal from light falling on the pixel sensor element, image sensors, imaging devices, and methods.

A pixel sensor element has a photodetector, such as a CMOS photodiode, arranged to generate a signal, such as a charge or voltage, in response to light. The generated signal is read from the pixel sensor element. In typical arrangements, many pixel sensor elements are arranged in an array of rows and columns to form an image sensor for capturing images. In this arrangement, each pixel sensor element will capture a single pixel of the captured image. These image sensors may be incorporated into an imaging device such as a video camera.

One particular application of pixel sensor elements is in the capture of image data at high-speed, such as those ranging from a few thousand frames per second to over a million frames per second. Existing photodetectors are able to operate at these high frame rates, but the resolution (i.e. the number of operational pixel sensor elements during the high speed imaging) is often required to be reduced from the maximum possible resolution due to limitations in the read-out circuitry. This means that at frame rates over a few thousands of frames per second, the number of pixels of image data per frame captured by the imaging device has to be reduced. High-speed imaging in excess of one million frames per second is possible, but only at a low resolution which is of limited use for many applications.

Referring to FIG. 1, there is shown a prior art pixel sensor element indicated generally by the reference numeral 100 of an existing imaging device known as the KIRANA by Specialised Imaging Ltd. This KIRANA attempts to overcome or mitigate the low-resolution of former high-speed imaging devices. All of the pixel sensor elements 100 of the image sensor are able to be operated at the same time to capture 180 frames of image data at a frame rate of up to 5 million frames per second. This is because the pixel sensor element 100 incorporates a storage array indicated generally by the reference numeral 105. The storage array 105 has 180 storage cells, each of which is capable of storing a charge representing a frame of pixel data. Therefore, 180 consecutive frames of pixel data are able to be stored in each pixel sensor element 100 of the imaging device simultaneously, prior to the read-out circuitry being engaged to transfer charge. The stored image data will still need to be read-out by the conventional read-out circuitry, but this can be done at a slower rate and at a later time that does not require a reduction in the number of operational pixel sensor elements. The read out is performed at a rate limited by the readout structures. In the example KIRANA imaging device, the read-out rate is approximately 1100 frames per second.

The storage array 105 is arranged to receive charge from photodetector 101 via transfer gate 103. The storage array 105 has an input shift register 107 having 10 storage cells arranged in a vertical column. A first of the storage cells 109 is arranged in proximity to the transfer gate 103 such that the first storage cell 109 may receive charge from the transfer gate 103. The storage array 105 further has a storage shift register 111 having 10 rows of storage cells with each row having 16 storage cells arranged horizontally. Each row of the storage shift register 111 is arranged in proximity to a storage cell of the input shift register 107. In this way, for example, the last storage cell 110 of the input shift register 107 is in proximity to the first storage cell 113 of the last row of the storage shift register 111. The storage array 105 further has an output shift register 115 having 10 storage cells arranged in a vertical column. The output shift register 115 is arranged such that each storage cell is arranged in proximity to a row of the storage shift register 111. In this way, for example, the last storage cell 114 of the last row of the storage shift register 111 is in proximity to the last cell 117 of the output shift register 115. The last cell 117 of the output shift register 115 is arranged in proximity to a read-out region 119 such that charge may be read from the last cell 117 of the output shift register 115.

The pixel sensor element 100 further has an anti-blooming gate 121. The anti-blooming gate 121 is connected to a power rail (not shown). The anti-blooming gate 121 is activated to effectively dump the charge. This is used for exposure control in normal operation.

During a burst-mode operation where up to 180 frames of image data is desired to be captured at a very high frame rate (e.g. a minimum of 1 microsecond per frame), the following operation is performed for each pixel sensor element 100.

Charge is transferred from the photodetector 101 to the first storage cell 109 of the input shift register 107 at the burst-mode frame rate, and shifted along the storage cells of the input shift register 107 until the input shift register 107 is full. Then the charges in the storage cells of the input shift register 107 are transferred in parallel to the first cell of each row of the storage shift register 111. In this way, for example, the charge in the last cell 110 of the input shift register 107 is transferred to the first cell 113 of the last row of the storage shift register 111. The storage shift register 111 shifts charge along its rows at $\frac{1}{10}^{th}$ the burst mode frame rate such that each time the input shift register 107 is full, the first cells of each row of the storage shift register 111 are empty and able to receive charge from the input shift register 107. In this way, charge is transferred to the storage shift register 111 each time the input shift register 107 is full. Once the storage shift register 111 is full, the charges in the last cells of each row of the storage shift register 111 are transferred to the output shift register 115. The read-out circuitry is then able to read-out the charge from the last storage cell 117 of the output shift register 115, and the charges are shifted down through the output shift register 115 until the output shift register 115 is empty. The charges stored in the input and storage shift registers 107, 111 may then be shifted to the output shift register 115 such that the storage array 105 is emptied. In the burst mode operation, the storage array 105 therefore provides a buffer to temporarily store up to 180 frames of pixel data for read-out later.

In a non-burst-mode operation (i.e. a continuous-mode operation) where the imaging device operates at a lower frame rate, the storage of intermediate frames is not necessary.

Although this prior art pixel sensor element has been successful in enabling images to be captured at a high frame rate and resolution, it is desirable to improve the performance of the existing pixel sensor element or at least provide an alternative pixel sensor element.

According to the present invention there is provided a pixel sensor element, imaging sensor, imaging device, storage assembly and method as set forth in the appended claims. Other features of the invention will be apparent from the dependent claims, and the description which follows.

According to a first aspect of the invention, there is provided a pixel sensor element for generation of a signal from light falling on the pixel sensor element comprising: a photodetector arranged to generate a signal in response to light; a storage assembly comprising a number N of storage arrays, where N is 2 or more, each storage array comprising: an input shift register and an output shift register each with a number M of storage cells arranged in a column, where M is 1 or more; and a storage shift register with a number R of rows of storage cells, each row comprising a number P of storage cells, where P is 1 or more, arranged for signal transfer from the input shift register to the output shift register; and a number N of independently driveable signal transfer regions, each arranged to be inducable to transfer the signal from the photodetector to a first cell of one of a respective one of the input shift registers; and a number N of signal read-out regions each arranged to be inducable to read the signal from a last cell of a respective one of the output shift registers.

The photodetector is a single photodetector, wherein the N signal transfer regions are arranged to be inducable to transfer the signal from the single photodetector.

In another arrangement, the photodetector is a photodetector region comprising N photodetectors arranged mutually adjacent to one another, and each arranged to independently generate a signal in response to light (i.e. each photodetector region generates a signal in its own right, independently of the other adjacent photodetector regions), wherein each of the N signal transfer regions is arranged to be inducable to transfer the signal from a respective one of the N photodetectors. In other words, each signal transfer region is arranged for signal transfer from just one of the N independent photodetectors on the photodetector region, with each photodetector of the photodetector region having a dedicated signal transfer region associated therewith. In this arrangement, the N photodetectors may be arranged in a row or an array, separated from one another sufficiently to permit independent signal generation. In this arrangement, the N signal transfer regions may be arranged to be driven sequentially to transfer signals from the N photodetectors to the associated input shift registers. The term "sequentially" as used in relation to this embodiment and generally within this specification means "one followed by another repeatedly in a predetermined sequence" and does not imply any specific order. So, if there are 4 transfer regions labelled 1, 2, 3 and 4, sequentially can mean that the order is 1, 2, 3, 4, 1, 2, 3, 4, etc. or it may be 1, 3, 2, 4, 1, 3, 2, 4 etc. or any other predetermined arrangement. Also, the term includes arrangements where one or more transfer regions may be omitted from the sequence, such as 3, 2, 1, 3, 2, 1, etc.

Here, "light" may refer to electromagnetic radiation of any wavelength that is capable of inducing a photodetector to generate a signal. The light may be infrared, visible light, ultraviolet light, or x-rays. In one preferred arrangement, the light is visible light.

Advantageously, the pixel storage element according to the first aspect comprises two or more storage arrays arranged to receive signals from the photodetector via two or more independently driveable signal transfer regions. In this way, the signal transfer regions may be driven alternately to transfer the signal from the photodetector to the input shift registers of the associated storage array. Therefore, the storage arrays of the pixel storage element are able to be engaged alternately to store signals for alternate frames of pixel data. Significantly, this means that the signal transfer regions, input shift registers, and output shift registers are able to operate at 1/N times the frame rate rather than at the frame rate as in the existing system highlighted above which only has a single storage array 105 (FIG. 1), and one transfer gate 103 for transferring charge to this single storage array 105. In addition, the storage shift registers are able to operate at 1/(N*M) times the frame rate rather than 1/M times the frame rate as in the existing system highlighted above. The reduced frame rate of the shift registers of the pixel storage element according to the first aspect means that the shift registers of the pixel sensor element are able to operate at a lower speed, while still enabling the pixel sensor element to capture the frames of pixel data at the high frame rate of the photodetector. The power consumption for the pixel sensor element is reduced, and less heat is generated. This is turn means that higher imaging speeds are possible.

In addition, the number of shifts through which each signal is required to undergo when moving between the photodetector and the output is able to be reduced by the pixel sensor element of the first aspect. This helps reduces the amount of lag introduced due to limitations in signal transfer efficiency for the storage cells.

The number N may be 4. The photodetector may be positioned in a central region of the pixel sensor element, and the 4 storage arrays are positioned symmetrically around the photodetector. The pixel sensor element may be square or rectangular in shape. The 4 storage arrays may be positioned in different quadrants of the square or rectangular in shape pixel sensor element. The 4 signal transfer regions may each be arranged in a corner region of the different quadrants that is proximal to a central region of the photodetector. The 4 signal read-out regions may be arranged in a corner region of the different quadrants that is proximal to an edge region of the photodetector. The columns of the input shift registers and the output shift registers may be arranged vertically in the pixel sensor element, and the rows of the storage shift registers may be arranged horizontally in the pixel sensor element.

The photodetector may be arranged to generate charge in response to light. The input shift register and/or the output shift register and/or the storage shift register may be charge-coupled device, CCD, shift registers. All of the input shift register, output shift register and storage shift register may be CCD shift registers. The signal read-out region may be arranged to convert charge read from the output shift registers to generate a voltage or current signal.

In other arrangements according to the invention, the photodetector may be arranged to generate a voltage or current signal in response to light.

The photodetector may comprise or be a complementary metal-oxide semiconductor—CMOS—photodetector or a CMOS photodiode. In this arrangement, the input shift registers, output shift registers, and storage shift registers, may be CCD shift registers. In this example, the signal generated by the photodetector is a charge. The signal read-out regions may include charge-voltage converters to convert the charge read from the output shift registers to generate a current or voltage signal.

In this arrangement, the CCD cells may be required to be manufactured as part of the CMOS manufacturing process, and as such the efficiency of operating the CCD cells is reduced as compared to a standard CCD manufacturing process. This can lead to lag between frames due to less than ideal charge transfer efficiency. Significantly, however, the pixel sensor element reduces the amount of lag as compared to the existing system by reducing the number of CCD storage cells that each charge as to be shifted through.

The signal transfer regions may be transfer gates.

The number M may be 2 or more, for instance from 3 to 10. M may be 5.

The number P may be 2 or more, for instance from 3 to 14. P may be 7.

In one arrangement, M is 5 and P is 7. In this arrangement, the number of shifts each signal is required to go through is between 9 and 17. By contrast, in the prior art KIRANA pixel sensor element as set out in FIG. 1, each signal was required to go through 26 signal shifts. Lag due to reduced signal transfer efficiency may be introduced for each shift through a storage cell. This reduced signal transfer efficiency may be inherent due to the way in which the storage cells are manufactured. Any lag produced by reduced signal transfer efficiency in the storage cells is therefore reduced by this arrangement as the number of shifts is reduced.

In another arrangement, N is 4, M is 5 and P is 7. This arrangement enables the storage arrays to be conveniently fitted in the pixel sensor element, taking into account geometry constraints in the production process. While a larger pixel sensor element could fit high numbers of N, M or P this may be at the expense of spatial resolution for the imaging device, as each pixel sensor element would occupy a larger area. In this arrangement, the photodetector may be positioned in a central region of the pixel sensor element, and the 4 storage arrays are positioned symmetrically around the photodetector. The pixel sensor element may be square or rectangular in shape. The 4 storage arrays may be positioned in different quadrants of the pixel sensor element.

The storage assembly may have 180 storage cells. Each storage array may have 180/N storage cells. The number N may be 4, and each of the 4 storage arrays may have 45 storage cells. The 180 storage cells may be CCD storage cells.

The input shift register may be arranged to be driven at 1/N the frame rate. The output shift register may be arranged to be driven at 1/N the frame rate. The storage shift register may be arranged to be driven at 1/(N times M) the frame rate.

The pixel sensor element may be arranged to be driven in a burst-mode where the storage assembly stores signals until the storage assembly is full. The signal read-out regions may be activated once the storage assembly is full to read-out signals from the last cells of the output shift registers.

The pixel sensor element may be arranged to be driven in a continuous-mode, where the storage assembly is not required to store signals until the storage assembly is full. In the continuous-mode, the storage assembly essentially acts as a delay line between the signal transfer regions and the read-out regions. In one example continuous mode operation, signals are transferred from the input shift registers to the associated storage shift registers once per frame.

One or more of the input shift registers and the output shift registers may be arranged to be driven to shift signals in either direction. That is, the direction of signal transfer in one or more of the input shift registers and the output shift registers may be reversible. One or more of the input shift registers may be arranged to be driven to shift signals away from the signal transfer regions or towards the signal transfer regions. One or more of the output shift registers may be arranged to be driven to shift signals away from the signal read-out regions or towards the signal read-out regions.

In one arrangement, all of the input shift registers are arranged to be driven to shift signals in the same direction, either towards or away from the signal transfer regions. In this arrangement, all of the output shift registers are arranged to be driven to shift signals in the same direction, either towards or away from the signal read-out regions. When the input shift registers are arranged to be driven to shift signals towards the signal transfer regions, the output shift registers are arranged to be driven to shift signals away from the signal read-out regions. When the input shift registers are arranged to be driven to shift signals away from the signal transfer regions, the output shift registers are arranged to be driven to shift signals towards the signal read-out regions.

In another arrangement, N is 4, and the input shift registers of 2 of the storage arrays are arranged to be driven to shift signals in a first direction, either towards or away from the signal transfer regions, and the input shift registers of the other 2 of the storage arrays are arranged to be driven to shift signals in a second, opposite, direction, either towards or away from the signal transfer regions. In this way, when the input shift registers of the 2 of the storage arrays are arranged to be driven to shift signals towards the signal transfer regions, the input shift registers of the other 2 of the storage arrays are arranged to be driven to shift signals away from the signal transfer regions. In this arrangement, the output shift registers of the 2 of the storage arrays are arranged to be driven to shift signals in a first direction, either towards or away from the signal read-out regions, and the output shift registers of the other 2 of the storage arrays are arranged to be driven to shift signals in a second, opposite, direction, either towards or away from the signal read-out regions. In this way, when the output shift registers of the 2 of the storage arrays are arranged to be driven to shift signal away from the signal read-out regions, the output shift registers of the other 2 of the storage arrays are arranged to be driven to shift signals away from the signal read-out regions.

In this arrangement, the photodetector may be positioned in a central region of the pixel sensor element, the pixel sensor element may be square or rectangular in shape and the 4 storage arrays may be positioned in different quadrants of the pixel sensor element. The 2 of the storage arrays having the input shift registers and the output shift registers arranged to be driven to shift signals in the first direction may be positioned in diagonally opposite quadrants of the pixel sensor element.

According to a second aspect of the invention, there is provided an image sensor comprising a plurality of the pixel sensor elements according to the first aspect. The pixel sensor elements may be arranged in an array of rows and columns.

All of the pixel sensor elements may be arranged to generate signals representing frames of pixel data substantially simultaneously. During a burst-mode operation, all of the pixel sensor elements may be arranged to store the signals representing the frames of pixel data in the storage assemblies of the pixel sensor elements.

The photodetectors may be arranged in rows and may comprise storage arrays arranged in pairs of adjacent rows between the rows of photodetectors. A single row of storage arrays may be arranged below the lower-most row of photodetectors, and a single row of storage arrays may be arranged above the upper-most row of photodetectors.

For each pair of adjacent rows of storage arrays, each storage array of a first of the pair of adjacent rows may be operably connected to an adjacent storage array of a second of the pair of adjacent rows to form a paired storage array. Each paired storage array may be arrangeable to act as a single storage array having an input shift register and an output shift register with 2M of storage cells arranged in a column and a storage shift register with 2M of rows of storage cells, each row having P storage cells.

For each pair of adjacent rows of storage arrays, one or more of the input shift registers and the output shift registers may be arranged to be driven to shift signals in either direction. That is, the direction in which the input shift registers and the output shift registers shift signals may be reversed. One or more of the input shift registers may be arranged to be driven to shift signals away from the signal transfer regions or towards the signal transfer regions. One or more of the output shift registers may be arranged to be driven to shift signals away from the signal read-out regions or towards the signal read-out regions.

For each pixel sensor element of the image sensor, the number N may be 4. The photodetector may be positioned in a central region of the pixel sensor element. The pixel sensor element may be square or rectangular in shape and the 4 storage arrays may be positioned symmetrically around the photodetector, or in different quadrants of the pixel sensor element.

In one arrangement, for each pair of adjacent rows of storage arrays, each paired storage array may be arranged to be driven in the same direction. The input shift registers of the paired storage arrays may be arranged to be driven in a first direction, and the output shift registers of the paired storage arrays may be arranged to be driven in a second, opposite direction. In this way, the input shift register of one of the storage arrays in the paired storage array is arranged to transfer the signal to the input shift register of the other one of the storage arrays in the paired storage array. The output shift register of the other one of the storage arrays in the paired storage array is arranged to transfer the signal to the output shift register of the one of the storage arrays in the paired storage array.

In this arrangement, only alternate rows of pixel sensor elements may have photodetectors activated to generate signals in response to light. For example, every odd numbered row of pixel sensor elements may not be activated to generate signals in response to light, and every even numbered row of pixel sensor elements may be activated to generate signals in response to light.

In this arrangement, the rows of pixel sensor elements with photodetectors that are not activated to generate signals in response to light may be arranged to have their input shift registers and output shift registers driven in reverse. In other words, each input shift register is arranged to transfer signals towards the signal transfer region associated with the input shift register, and each output shift register is arranged to transfer signals away from the read-out region associated with the output shift register. In this arrangement, one or more of the storage arrays of these photodetectors that are not activated to generate signals in response to light may act as additional storage capacity for the photodetectors that are activated to generate signals in response to light.

In another arrangement, for each pair of adjacent rows of storage arrays, at least one or each paired storage array may be arranged to be driven in a different direction to the driving direction of adjacent paired storage arrays. In other words, adjacent paired storage arrays may be arranged to be driven in the opposite direction to one another. For at least one or each paired storage array, the input shift registers may be arranged to be driven in a first direction, opposite to the driving direction of the input shift registers of the adjacent paired storage arrays. For at least one or each paired storage array, the output shift registers may be arranged to be driven in a second direction, opposite to the driving direction of the output shift registers of the adjacent paired storage arrays. The second direction may be opposite to the first direction.

In this arrangement, all of the photodetectors may be activated to generate signals in response to light.

According to a third aspect of the invention, there is provide an imaging device comprising an image sensor according to the second aspect. The imaging device may be a video camera for use in high speed imaging. Applications include ballistics, sports, aeronautics, materials testing, fluid mechanics, satellite imaging, vehicular imaging and plasma studies.

The imaging device may comprise a controller operable to apply drive signals to the photodetectors and storage cells of the pixel sensor elements so as to control the frame rate of the photodetectors and the signal transfer rate of the storage cells. The controller may be operable to control the storage cells of the input and/or output shift registers to transfer signals at 1/N the frame rate of the photodetector. The controller may be operable to control the storage cells of the storage shift registers to transfer signals at 1/(N times M) the frame rate of the photodetector.

The controller may be operable to control the direction in which the input shift registers and the output shift registers transfer signals. That is, the controller may be operable to selectively reverse the direction in which some or all of the input shift registers and the output shift registers transfer signals.

The controller may comprise a plurality of controllers with each controller being integrated into one of the pixel sensor elements. The controller may be integrated into the image sensor. Alternatively, the controller may a separate component of the imaging device.

The controller may be operable to drive the input shift registers and output shift registers of every pixel sensor element in the same way. The controller may be operable to drive each input shift register to transfer signals in the direction away from the signal transfer region associated with the input shift register. The controller may be operable to drive each output shift register to transfer signals in the direction towards the signal read-out region associated with the output shift register.

The controller may be operable to reverse the driving direction for the input shift registers and output shift registers of half of the pixel sensor elements of the image sensor.

In one example, the controller is operable to reverse the driving direction of alternate rows of pixel sensor elements in the image sensor. For the rows of pixel sensor elements that have their driving directions reversed, the photodetectors may not be activated to generate signals in response to light. The controller may be operable to control the input shift registers for every other row of pixel sensor elements in the image sensor to transfer signals towards the signal transfer regions associated with the input shift registers. The controller may be operable to control the output shift registers for every other row of pixel sensor elements in the image sensor to transfer signals away from the signal read-out regions associated with the output shift registers.

In another example, the controller is operable to drive each storage array such that the driving direction of the storage array is different to that of adjacent storage array. In this arrangement, all of the photodetectors may be activated to generate signals in response to light According to a fourth aspect of the invention, there is provided a storage assembly for storage and transfer of a signal from a photodetector in a pixel sensor element, the storage assembly comprising: a number N of storage arrays, where N is 2 or more, each storage array comprising: an input shift register and an output shift register each with a number M of storage cells arranged in a column, where M is 1 or more; and a storage shift register with a number M of rows of storage cells, each row having a number P of storage cells, where P is 1 or more, arranged for signal transfer from the input shift register to the output shift register. The photodetector is a single photodetector.

The number N may be 4. The 4 storage arrays may be positioned symmetrically around the photodetector. The pixel sensor element may be square or rectangular in shape. The 4 storage arrays may be positioned in different quadrants of the square or rectangular in shape pixel sensor element. The columns of the input shift registers and the output shift registers may be arranged vertically in the pixel sensor element, and the rows of the storage shift registers may be arranged horizontally in the pixel sensor element.

The number M may be 2 or more, for instance from 3 to 7. M may be 5.

The number P may be 2 or more, for instance from 3 to 10. P may be 7.

In one arrangement, M is 5 and P is 7.

In another arrangement, N is 4, M is 5 and P is 7.

The storage assembly may have 180 storage cells. Each storage array may have 180/N storage cells. The number N may be 4, and each of the 4 storage arrays may have 45 storage cells. The 180 storage cells may be CCD storage cells.

The input shift register may be arranged to be driven at 1/N the frame rate of the photodetector. The output shift register may be arranged to be driven at 1/N the frame rate of the photodetector. The storage shift register may be arranged to be driven at 1/(N times M) the frame rate of the photodetector.

One or more of the input shift registers and the output shift registers may be arranged to be driven to shift signals in either direction. That is, the direction of signal transfer in one or more of the input shift registers and the output shift registers may be reversible. One or more of the input shift registers may be arranged to be driven to shift signals away from the signal transfer regions or towards the signal transfer regions. One or more of the output shift registers may be arranged to be driven to shift signals away from the signal read-out regions or towards the signal read-out regions.

In one arrangement, all of the input shift registers are arranged to be driven to shift signals in the same direction, either towards or away from the signal transfer regions. In this arrangement, all of the output shift registers are arranged to be driven to shift signals in the same direction, either towards or away from the signal read-out regions. When the input shift registers are arranged to be driven to shift signals towards the signal transfer regions, the output shift registers are arranged to be driven to shift signals away from the signal read-out regions. When the input shift registers are arranged to be driven to shift signals away from the signal transfer regions, the output shift registers are arranged to be driven to shift signals towards the signal read-out regions.

In another arrangement, N is 4, and the input shift registers of 2 of the storage arrays are arranged to be driven to shift signals in a first direction, either towards or away from the signal transfer regions, and the input shift registers of the other 2 of the storage arrays are arranged to be driven to shift signals in a second, opposite, direction, either towards or away from the signal transfer regions. In this way, when the input shift registers of the 2 of the storage arrays are arranged to be driven to shift signals towards the signal transfer regions, the input shift registers of the other 2 of the storage arrays are arranged to be driven to shift signals away from the signal transfer regions. In this arrangement, the output shift registers of the 2 of the storage arrays are arranged to be driven to shift signals in a first direction, either towards or away from the signal read-out regions, and the output shift registers of the other 2 of the storage arrays are arranged to be driven to shift signals in a second, opposite, direction, either towards or away from the signal read-out regions. In this way, when the output shift registers of the 2 of the storage arrays are arranged to be driven to shift signal towards the signal read-out regions, the output shift registers of the other 2 of the storage arrays are arranged to be driven to shift signals away from the signal read-out regions.

In this arrangement, the photodetector may be positioned in a central region of the pixel sensor element, the pixel sensor element may be square or rectangular in shape and the 4 storage arrays may be positioned in different quadrants of the pixel sensor element. The 2 of the storage arrays having the input shift registers and the output shift registers arranged to be driven to shift in the first direction may be positioned in diagonally opposite quadrants of the pixel sensor element.

The input shift register and/or the output shift register and/or the storage shift register may be charge-coupled device, CCD, shift registers. All of the input shift register, output shift register and storage shift register may be CCD shift registers.

According to a fifth aspect of the invention, there is provided a method of operating a pixel sensor element according to the first aspect, the method comprising, for each storage array:

(i) inducing the signal transfer region to transfer a signal from the photodetector to the first cell of the input shift register;

(ii) for at least one cell of the input shift register, transferring the signal from the cell of the input shift register to a first cell of a corresponding row of the storage shift register;

(iii) for at least one row of the storage shift register, transferring the signal from a last cell of the row of the storage shift register to a corresponding cell of the output shift register;

(iv) inducing the signal read-out region to read the signal from the last cell of the output shift register.

(i) may be repeated until the input shift register is full. (ii) may be performed in response to the input shift register being full.

(ii) may be performed until the storage shift register is full. (iii) may be performed in response to the storage shift register being full.

The storage arrays may be sequentially activated to perform (i) and/or (iv).

The storage arrays may be substantially simultaneously activated to perform (ii) and/or (iii).

(i) may be performed at 1/N the frame rate of the photodetector, (ii) and (iii) may be performed at 1/(N times M) the frame rate of the photodetector. (iv) may be performed at 1/N the frame rate of the photodetector—this may be, for example, in a continuous-mode operation.

Each time (i) is performed signals may be shifted down the storage cells of the input shift register to empty the first cell of the input shift register. Each time (ii) is performed signals may be shifted across the storage cells of the rows of the storage shift registers to empty the first cell of each row of the storage shift register.

According to a sixth aspect of the invention, there is provided a method of operating an image sensor comprising a plurality of the pixel sensor elements according to the first aspect, the pixel sensor elements being arranged in an array of rows and columns with the photodetectors arranged in rows and comprising storage arrays arranged in pairs of adjacent rows between the rows of photodetectors, the method comprising:

controlling each of the pixels sensor elements to perform the method of any of the fifth aspect; and using the signals provided by the signal read-out regions of each pixel sensor element to generate an image.

According to a seventh aspect of the invention, there is provided a method of operating an image sensor comprising a plurality of the pixel sensor elements according to the first aspect, the pixel sensor elements being arranged in an array of rows and columns with the photodetectors arranged in rows and comprising storage arrays arranged in pairs of adjacent rows between the rows of photodetectors, wherein for each pair of adjacent rows of storage arrays, each storage array of a first of the pair of adjacent rows is operably connected to an adjacent storage array of a second of the pair of adjacent rows to form a paired storage array, such that each paired storage array is arrangeable to act as a single storage array having an input shift register and an output shift register with 2M of storage cells arranged in a column and a storage shift register with 2M of rows of storage cells, each row having P storage cells, the method comprising for each paired storage array:

controlling a pixel sensor element including a first storage array of the paired storage array to perform the method of the fifth aspect;

controlling a pixel sensor element including a second storage array of the paired storage array to, for the second storage array:
(i) receive at the input shift register, a signal from a last cell of the input shift register of the first storage array;
(ii) for at least one cell of the input shift register, transfer the signal from the cell of the input shift register to a first cell of a corresponding row of the storage shift register;
(iii) for at least one row of the storage shift register, transfer the signal from a last cell of the row of the storage shift register to a corresponding cell of the output shift register; and
(iv) transfer the signal from the output shift register to a first cell of the output shift register of the first storage array.

The pixel sensor element including the first storage array may be arranged to control the input shift register of the first storage array to shift signals in a first direction away from the signal transfer region associated with the input shift register. The pixel sensor element may further be arranged to control the output shift register of the first storage array to shift signals in a second direction towards the signal read-out region associated with the output shift register.

The pixel sensor element including the second storage array may be arranged to control the input shift register of the second storage array to shift signals in the first direction. That is, towards the signal transfer region associated with the input shift register. The pixel sensor element may be further arranged to control the output shift register of the second storage array to shift signals in the second direction. That is, away from the signal read-out region associated with the output shift register.

In this way, the pixel sensor element including the second storage array is controlled to reverse the direction in which the input shift register and the output shift register of the second storage array transfer signals.

(i) may be performed until the input shift register is full, and (ii) may be performed in response to the input shift register being full.

(ii) may be performed until the storage shift register is full, and (iii) may be performed in response to the storage shift register being full.

(iv) may be performed until the output shift register is empty.

Although a few preferred embodiments of the present invention have been shown and described, it will be appreciated by those skilled in the art that various changes and modifications might be made without departing from the scope of the invention, as defined in the appended claims.

For a better understanding of the invention, and to show how embodiments of the same may be carried into effect, reference will now be made, by way of example only, to the accompanying diagrammatic drawings in which.

Figure 2:
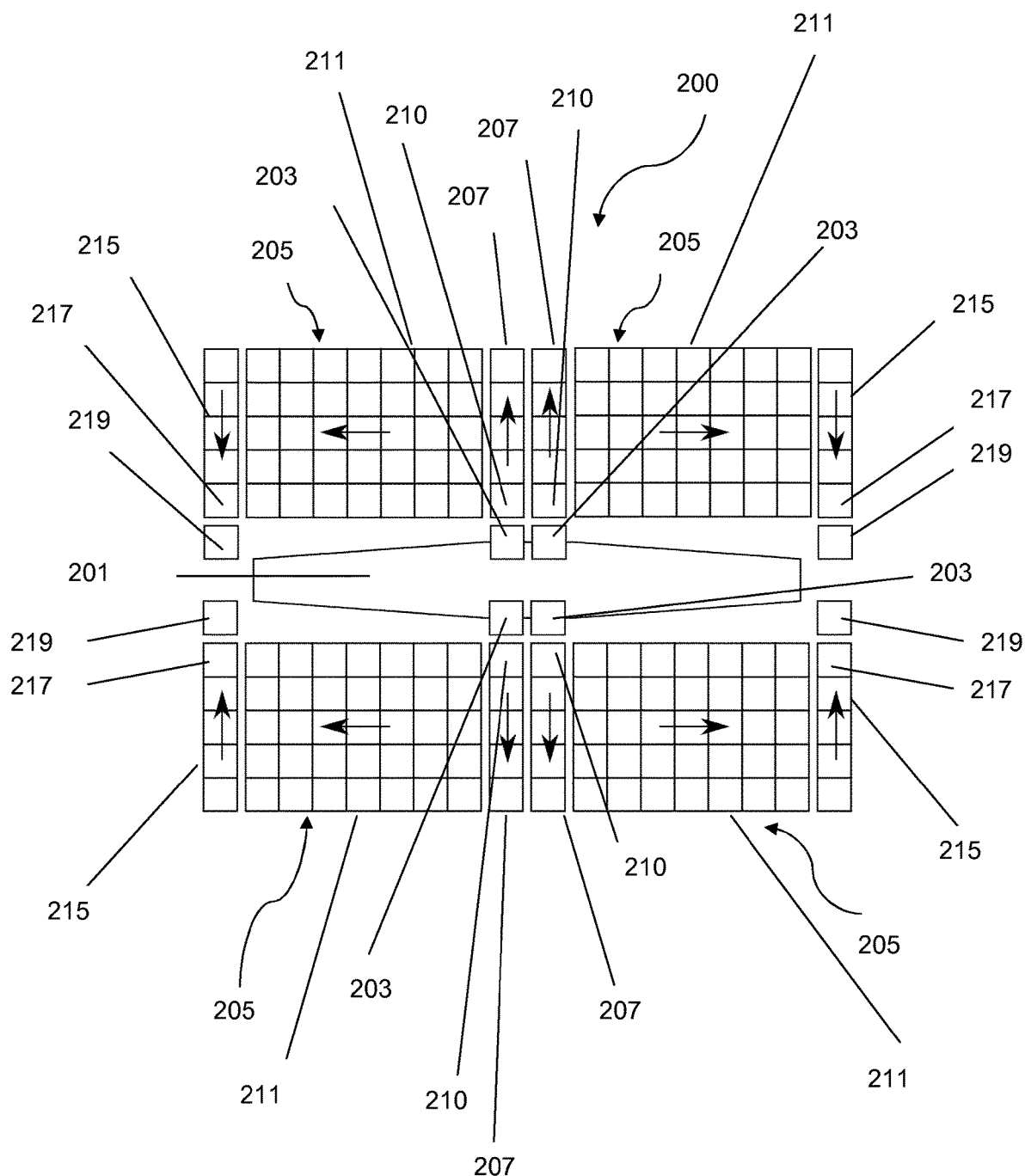
FIG. 2 shows a schematic diagram of a pixel sensor element according to the first aspect.

Referring to FIG. 2, there is shown a pixel sensor element according to the first aspect and indicated generally by the reference numeral 200. The pixel sensor element 200 is of a rectangular shape and comprises a central photodetector 201 arranged to generate a signal in response to light. The photodetector 201 is a single photodetector. A storage assembly is provided comprising four storage arrays each indicated generally by the reference numeral 205. The storage arrays 205 are positioned in different quadrants of the pixel sensor element 205. Here, "quadrant" refers to any of the four regions in which a plane is divided by the axes of a Cartesian coordinate system. Each storage array 205 comprises an input shift register 207 having 5 storage cells arranged in a vertical column, a storage shift register 211 having 5 horizontal rows of storage cells with each row having 7 storage cells, and an output shift register 215 having 5 storage cells arranged in a vertical column. The pixel sensor element 200 further has 4 independently driveable signal transfer regions 203, each arranged to transfer a signal from the photodetector 201 to a first cell 210 of one of the input shift registers 207. In addition, the pixel sensor element 200 has 4 signal read-out regions 219, each arranged to read-out the signal from a last cell 217 of one of the output shift registers 215.

The pixel sensor element 200 is able to be operated in a burst-mode where signals representing consecutive frames of pixel data are generated and stored in the storage assembly. This enables the pixel sensor element 200 to capture signals representing 180 (the total number of storage cells in the storage assembly) consecutive frames of pixel data at a high frame rate.

Figure 3:
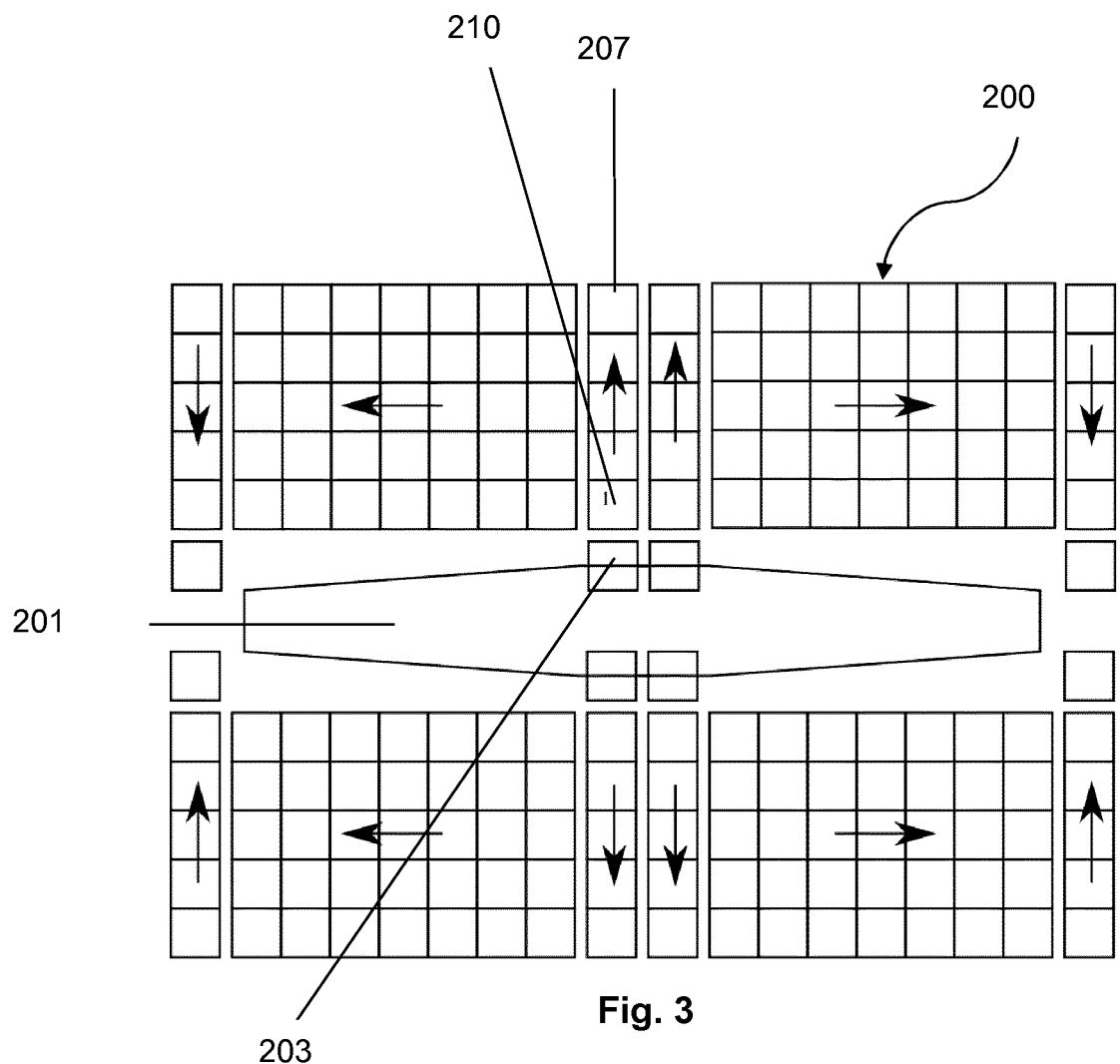
FIG. 3 shows another schematic diagram of a pixel sensor element according to the first aspect.

Referring to FIG. 3, there is shown a first step of the burst-mode operation in which a signal representing a first frame 1 of pixel data is captured. Here, the photodetector 201 has generated a signal in response to light, and the signal transfer region 203 of the upper-left quadrant has been induced to transfer the signal to the first cell 210 of the input shift register 207 of the upper-left quadrant.

Figure 4:
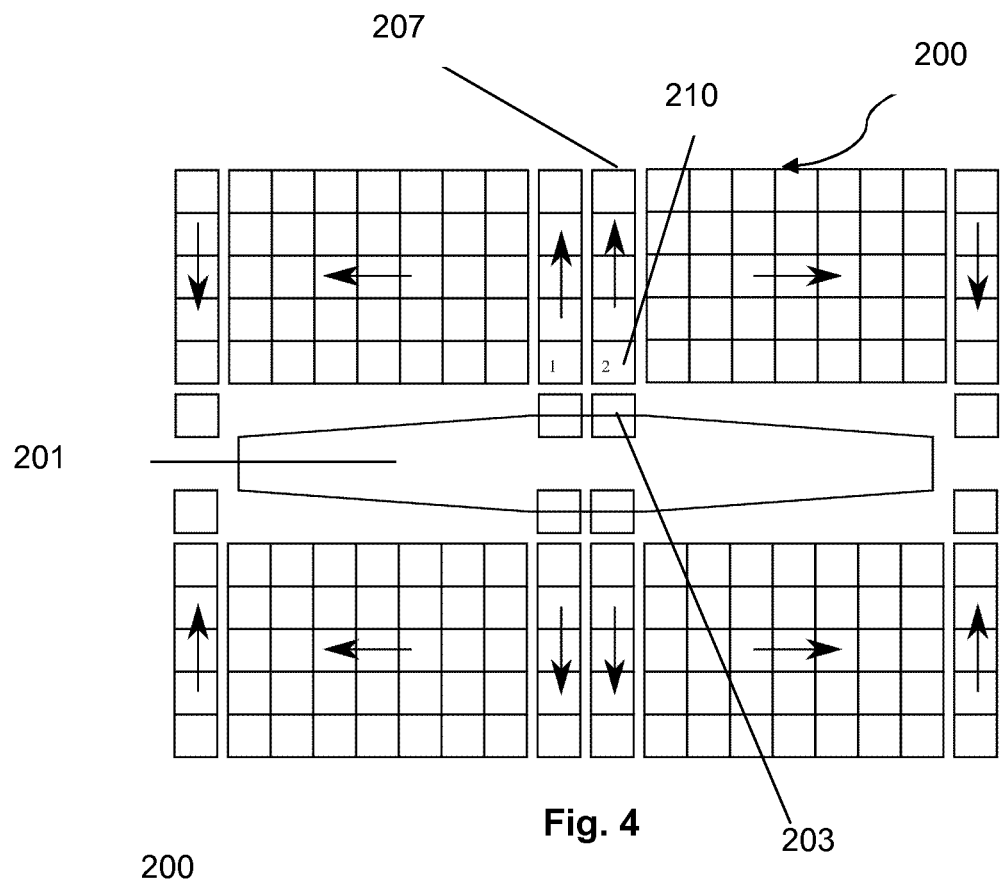
FIG. 4 shows yet another schematic diagram of a pixel sensor element according to the first aspect.

Referring to FIG. 4, there is shown a second step of the burst-mode operation, in which a signal representing a second frame 2 of pixel data is captured. Here, the photodetector 201 has generated a signal in response to light, and the signal transfer region 203 of the upper-right quadrant has been induced to transfer the signal to the first cell 210 of the input shift register 207 of the upper-right quadrant.

Figure 5:
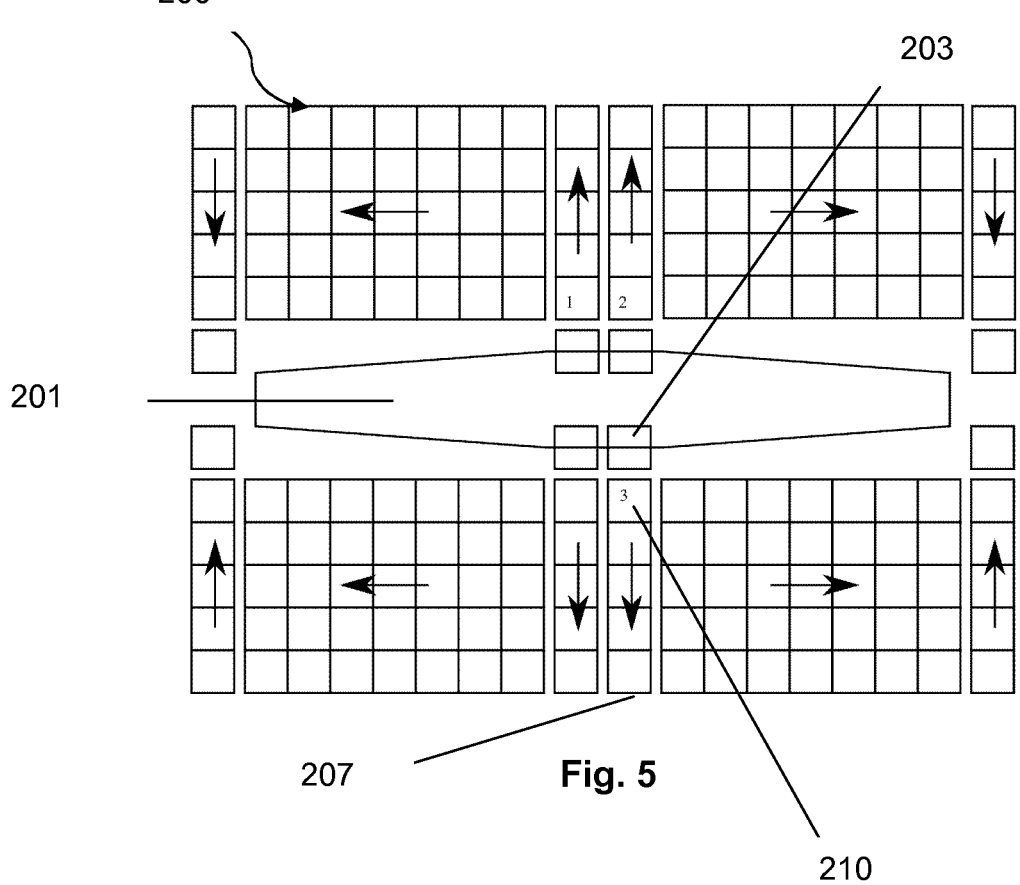
FIG. 5 shows yet another schematic diagram of a pixel sensor element according to the first aspect.

Referring to FIG. 5, there is shown a third step of the burst-mode operation, in which a signal representing a third frame 3 of pixel data is captured. Here, the photodetector 201 has generated a signal in response to light, and the signal transfer region 203 of the lower-right quadrant has been induced to transfer the signal to the first cell 210 of the input shift register 207 of the lower-right quadrant.

Figure 6:
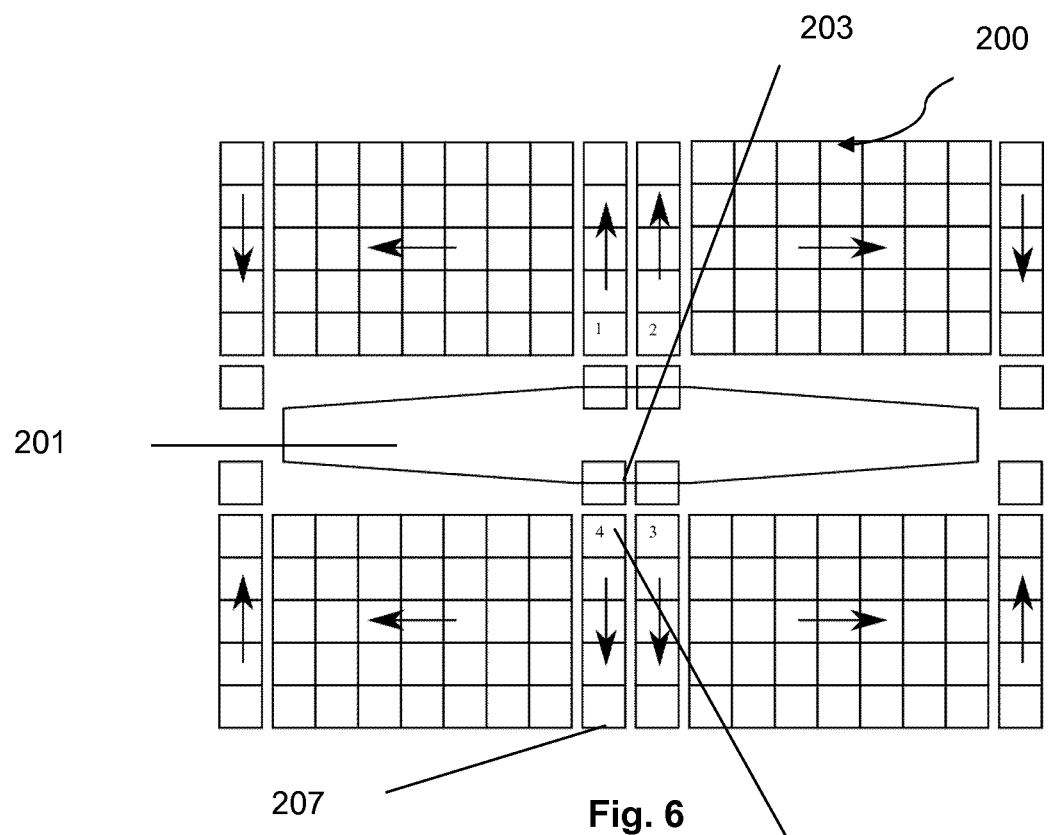
FIG. 6 shows yet another schematic diagram of a pixel sensor element according to the first aspect.

Referring to FIG. 6, there is shown a fourth step of the burst-mode operation, in which a signal representing a fourth frame 4 of pixel data is captured. Here, the photodetector 201 has generated a signal in response to light, and the signal transfer region 203 of the lower-left quadrant has been induced to transfer the signal to the first cell 210 of the input shift register 207 of the lower-left quadrant.

Figure 7:
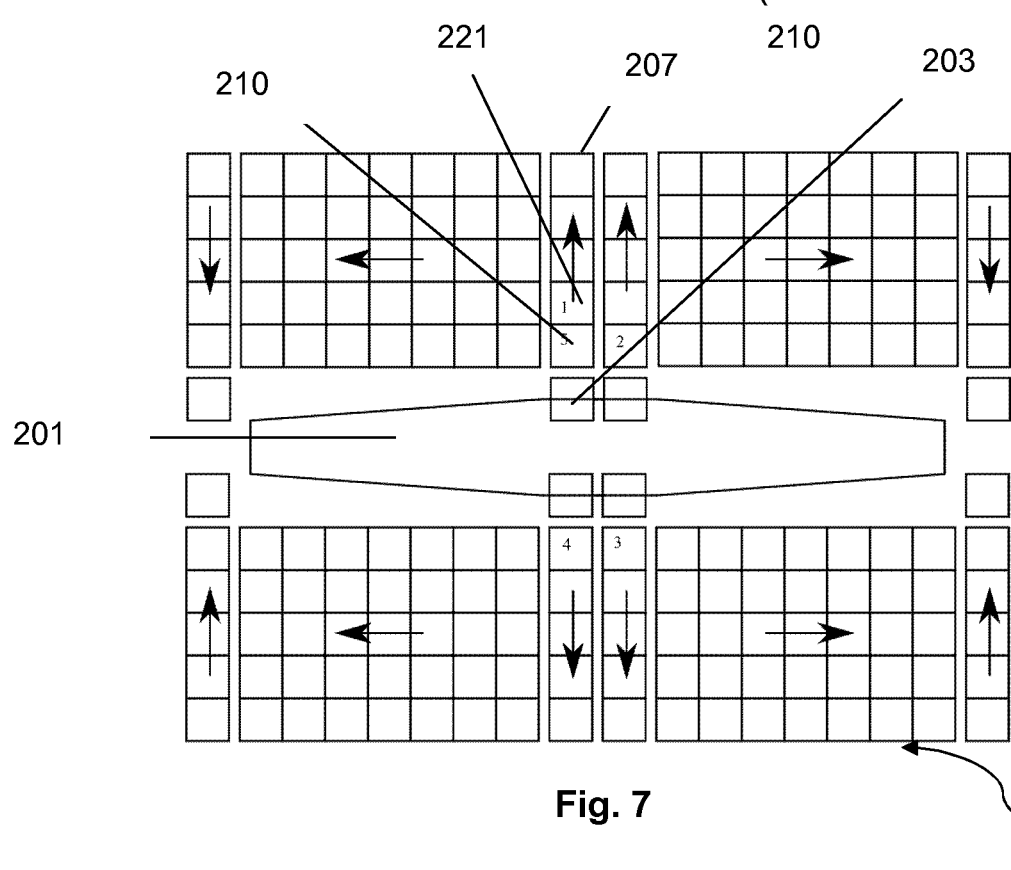
FIG. 7 shows yet another schematic diagram of a pixel sensor element according to the first aspect.

Referring to FIG. 7, there is shown a fifth step of the burst-mode operation, in which a signal representing a fifth frame 5 of the pixel data is captured. Here, the input shift register 207 of the upper-left quadrant has shifted the signal representing frame 1 to the next storage cell 221 in the input shift register 207. The photodetector 201 has generated a signal (representing the fifth frame of pixel data) in response to light, and the signal transfer region 203 of the upper-left quadrant has been induced to transfer the signal to the first cell 210 of the input shift register 207 of the upper-left quadrant.

Figure 8:
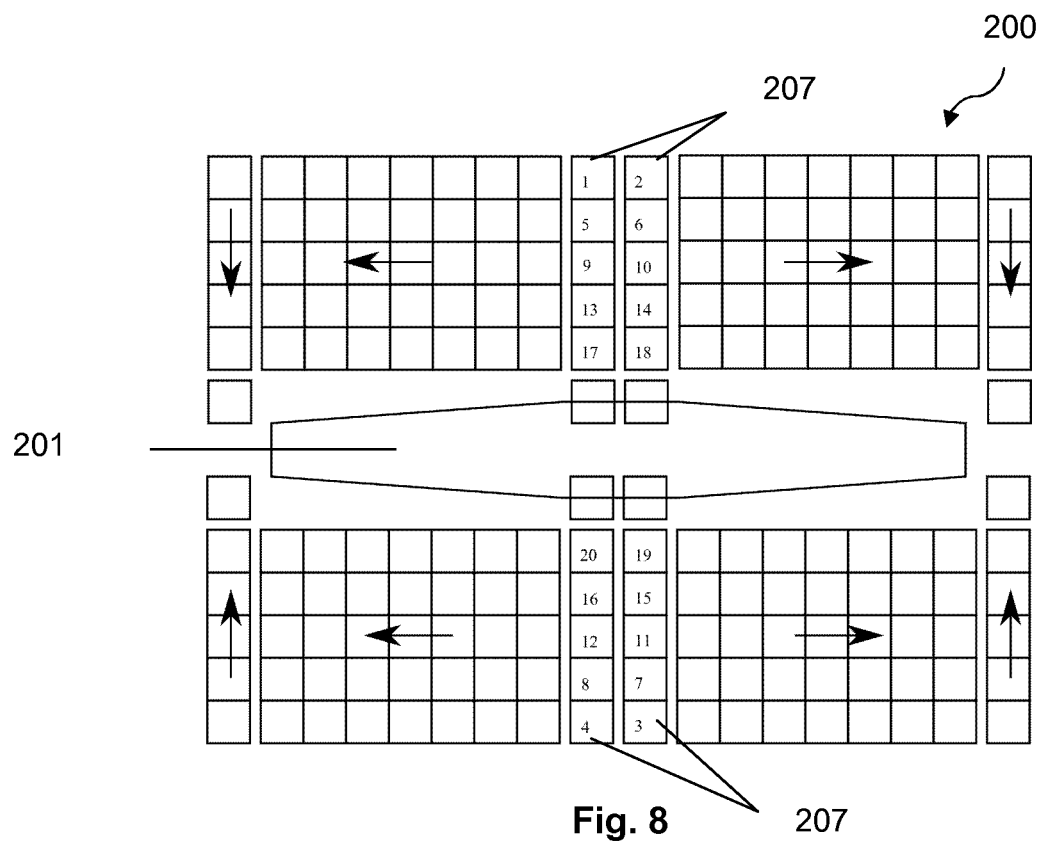
FIG. 8 shows yet another schematic diagram of a pixel sensor element according to the first aspect.

Referring to FIG. 8, there is shown the result of a twentieth step of the burst-mode operation in which a signal representing a twentieth frame 20 of pixel data was captured. Here, all of the storage cells of the four input shift registers 207 are full. It will be appreciated that steps six to twenty are performed in a similar way to step 5, whereby signals are shifted along the storage cells of the input shift registers 207 and signals are transferred to the first cells 210 of the input shift registers 207 by the signal transfer regions 203.

Figure 9:
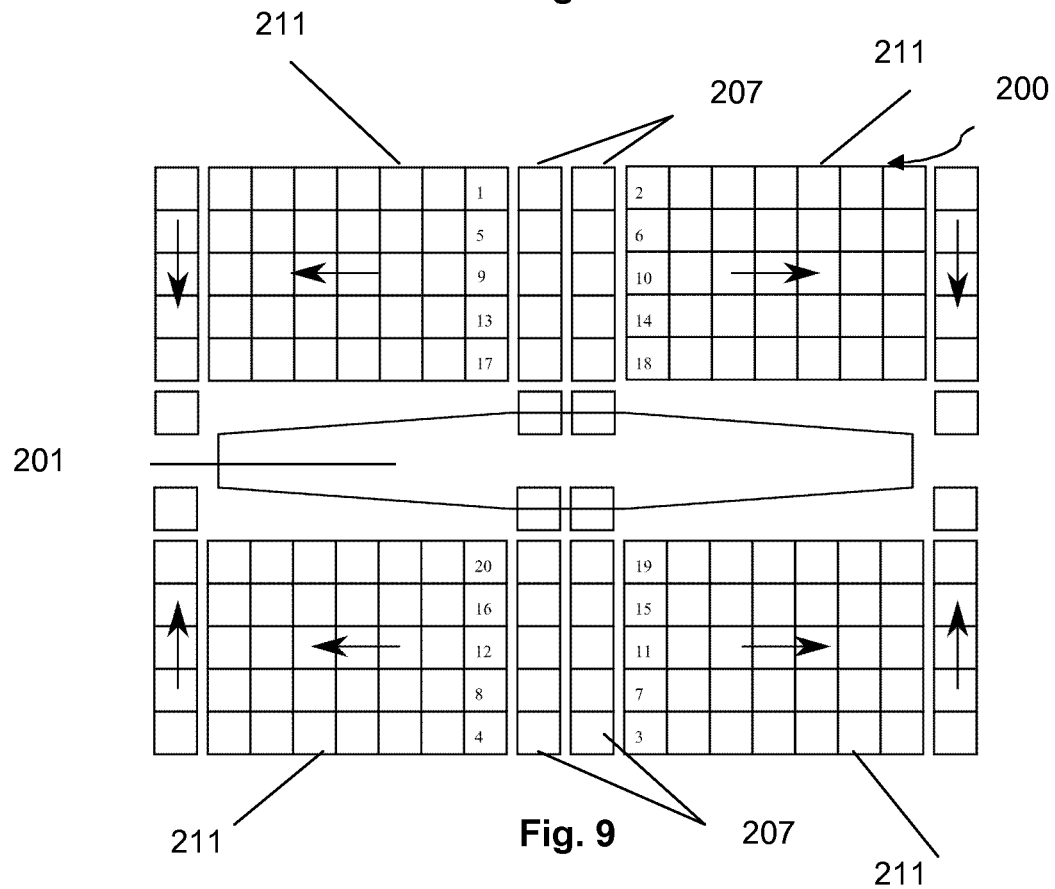
FIG. 9 shows yet another schematic diagram of a pixel sensor element according to the first aspect.

Referring to FIG. 9, there is shown part of a twenty-first step of the burst-mode operation in which a signal representing the twenty-first frame 21 of pixel data is captured.

Here, all five storage cells of each input shift register 207 are induced to transfer their stored signals to the first cells of each row of the storage shift registers 211. In this way, the input shift registers 207 are emptied such that they can receive signals from the photodetector 201.

Figure 10:
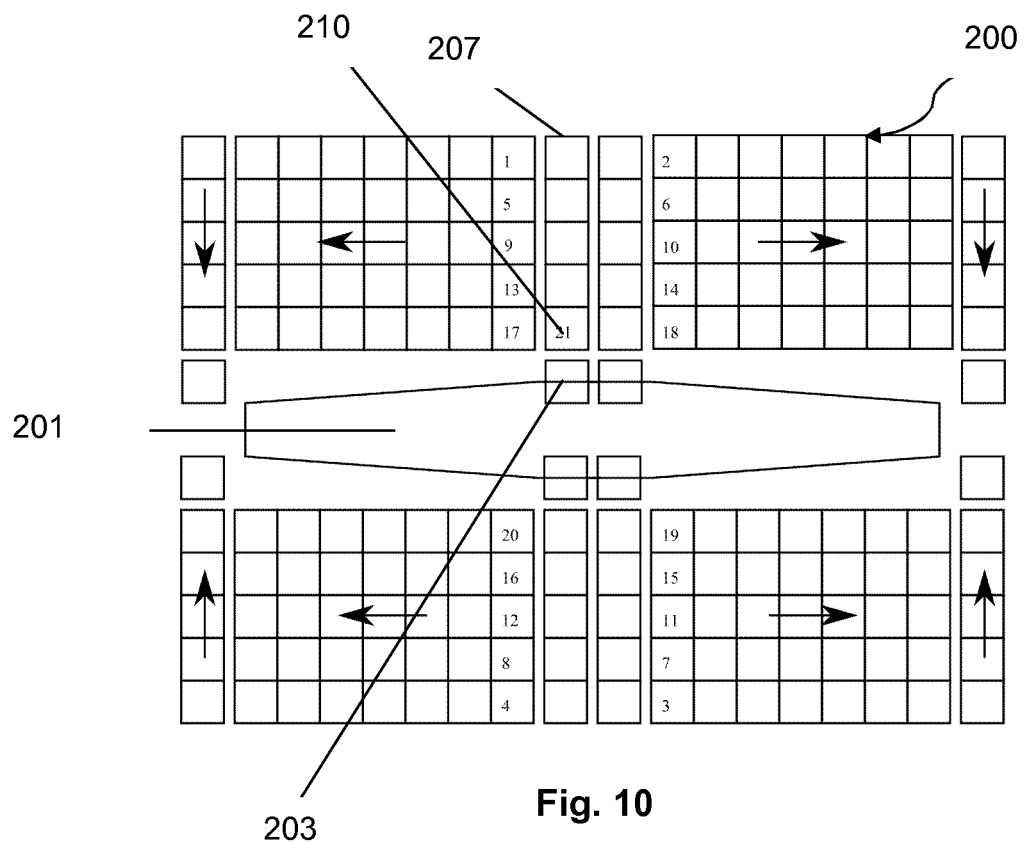
FIG. 10 shows yet another schematic diagram of a pixel sensor element according to the first aspect.

Referring to FIG. 10, there is shown another part of the twenty-first step of the burst-mode operation. Here, the photodetector 201 has generated a signal in response to light, and the signal transfer region 203 of the upper-left quadrant has been induced to transfer the signal to the first cell 210 of the input shift register 207 of the upper-left quadrant. In this way, the twenty-first frame 21 of pixel data is captured.

Figure 11:
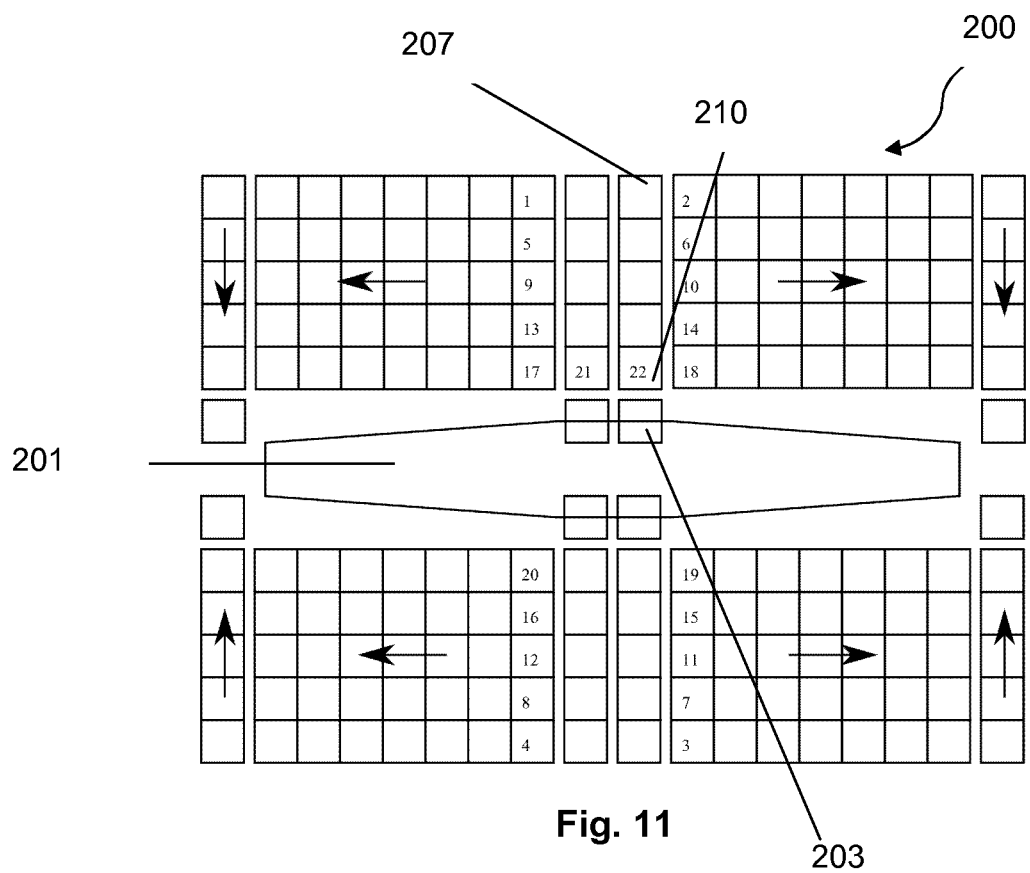
FIG. 11 shows yet another schematic diagram of a pixel sensor element according to the first aspect.

Referring to FIG. 11, there is shown a twenty-second step of the burst-mode operation in which a signal representing the twenty-second frame 22 of pixel data is captured. Here, the photodetector 201 has generated a signal in response to light and the signal transfer region 203 of the upper-right quadrant has been induced to transfer the signal to the first cell 210 of the input shift register 207 of the upper-right quadrant.

It will be appreciated that the subsequent steps are similar to those outlined above in which the input shift registers 207 are filled with signals. When the input shift registers 207 are full, the signals are shifted along the rows of the storage shift registers 211 such that the signals stored in the input shift registers 207 may be transferred to the first storage cells of each row of the storage shift registers 211.

After step 160 of the burst-mode operation, 160 signals representing 160 frames of pixel data have been captured and stored in the storage shift registers 211 and the input shift registers 207. The storage shift registers 211 and the input shift registers 207 are thus all full. During step 161 of the burst-mode operation, the signals stored in the last cell of each row of the storage shift registers 211 are transferred to the output shift registers 215. The signals are then shifted along the rows of the storage shift registers 211 until the first cell of each row of the storage shift registers 211 is free. Then, the signals stored in the input shift registers 207 are transferred to the first cell of each row of the storage shift registers 211 in a similar way to the twenty-first step as shown in FIG. 9. Then, during steps 161 to 180 of the burst-mode operation, the input shift registers 207 are filled with signals in a similar way to steps 1 to twenty so that the final 20 signals are captured.

At the end of the burst-mode operation, 180 frames of pixel data have been captured and stored in the storage assembly. The signals may be read out from the storage assembly immediately. The signals may also be stored in the storage assembly until a trigger is received to read the signals out. The signal read-out regions 219 may then be operated to read-out the stored signals from the last cell 217 of the output shift registers 215. As the signals are read out by the signal read-out regions 219, the signals are shifted through the output shift register 215 such that another signal is shifted to the last cell 217 of the output shift registers 215. Once the output shift registers 215 are empty, the signals in the last cell of each row of the storage shift registers 211 are shifted to the storage cells of the output shift registers 215. It will be appreciated that signals are then shifted along the storage shift registers 211, and signals in the input shift register 207 are transferred to the first cell of each row of the storage shift registers 211. This general operation is repeated until all of the storage cells are emptied.

While the capture and storage of signals in the storage assembly may be performed at a very high frame rate, the read-out of the signals from the storage assembly after the burst-mode operation has completed may be performed at a slower rate suited to the read-out circuitry of the imaging device in which the pixel sensor element 200 is installed.

The signals read-out by the signal read-out regions 219 are provided to a processing unit (not shown). In a burst-mode operation, the signals provided to the processing unit will not be in the correct temporal order. The processing unit will sort the signals so that they are in the correct temporal order. In most arrangements, the processing unit is external to the pixel sensor element 200, and is incorporated into the imaging device.

Significantly, for the pixel sensor element 200 of the first aspect, the input shift registers 207 alternately receive signals from the signal transfer regions 203. This means that each input shift register 207 is only required to shift signals at ¼ (because there are 4 input shift registers 207) the frame rate of the photodetector 201. By contrast, in the existing system the single input shift register 107 (FIG. 1) was required to shift signals at the frame rate. As a result, each input shift register 207 of the first aspect is able to operate at a lower signal transfer rate while still enabling the frames of pixel data to be captured at the frame rate of the photodetector 201. This lower signal transfer rate means that the power consumption is lower and less heat is generated by the input shift register 207. This arrangement therefore provides the potential for higher frame rates to be utilised.

In addition, the storage shift registers 211 are only required to transfer signals at 1/20 the frame rate because each storage shift register 211 is only required to transfer signals once all 20 storage cells of the input shift registers 207 are full. By contrast, in the existing system, the single storage shift register 111 (FIG. 1) was required to shift signals at 1/10 the frame rate because the single input shift register 107 had 10 storage cells. Advantageously, this further reduces the power consumption of the pixel sensor element 200 of the first aspect.

Figure 1:
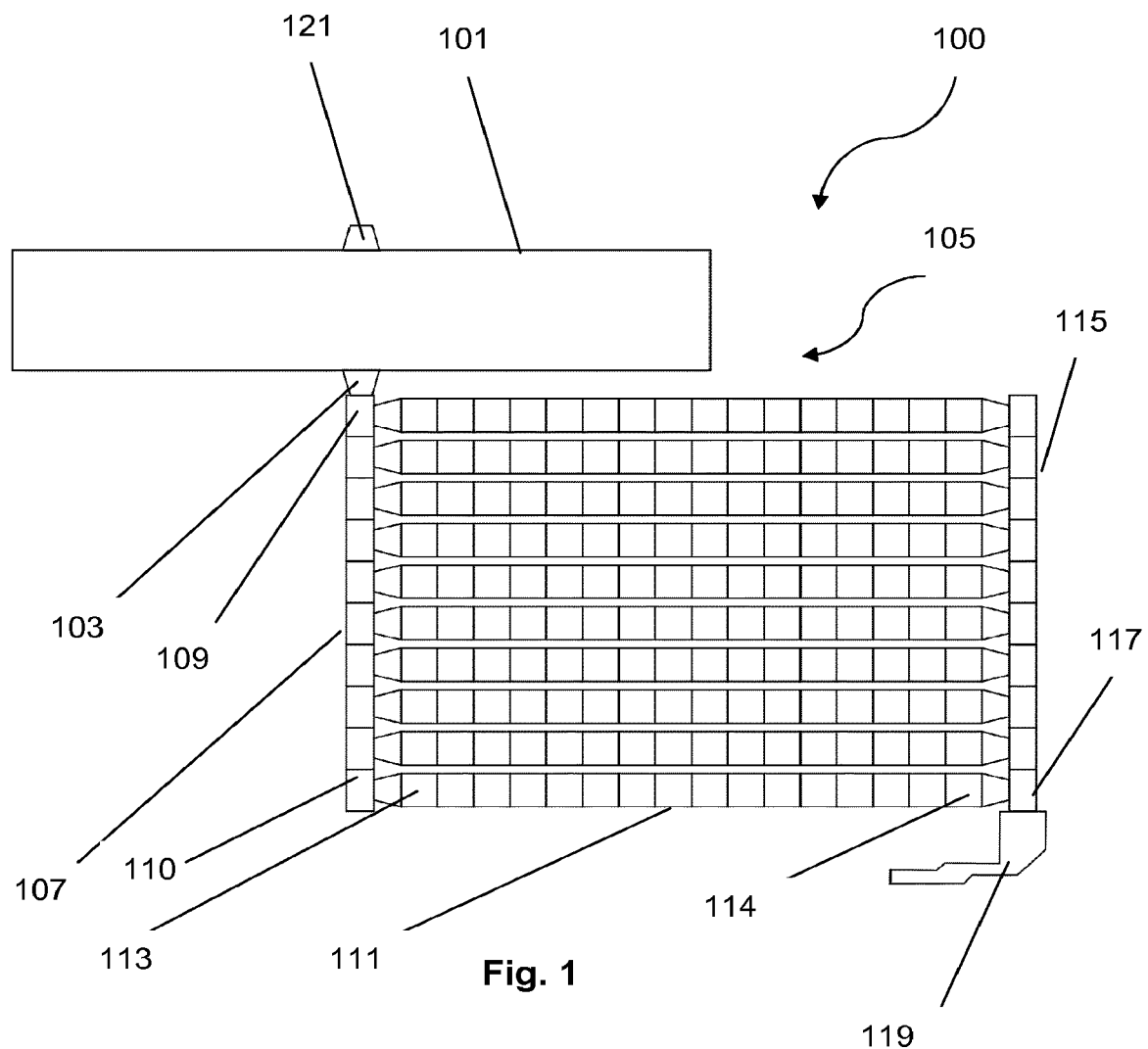
FIG. 1 shows a schematic diagram of a pixel sensor element according to an existing image sensor.

In addition, each generated signal will only be required to be shifted through between 9 and 17 storage cells to reach the signal read-out regions 219. A signal is shifted through 9 storage cells if it is shifted from the first cell 210 of an input shift register 207 to the first row of a storage shift register 211. A signal is shifted through 17 storage cells if it is shifted from the last cell of an input shift register 207 to the last row of a storage shift register 211. By contrast, in the existing system, each signal had to be shifted through 26 storage cells before it reached the read-out region 119 (FIG. 1). The pixel sensor element 200 therefore reduces the amount of lag due to poor signal transfer efficiency.

In one example, the photodetector 201 is a complementary metal-oxide semiconductor—CMOS—photodiode 201. The input shift registers 207, output shift registers 215 and storage shift registers 211 are all charge-coupled device—CCD—shift registers each comprising storage CCD cells. The signal transfer regions 203 are transfer gates 203. In this example, the signal generated by the photodetector 201 is a charge. The signal read-out regions 219 include charge-voltage converters to convert the charge in the last cell 217 of each output shift register 215 into a voltage signal. In this example, the CCD cells are required to be manufactured as part of the CMOS manufacturing process, and as such the efficiency of operating the CCD cells is reduced as compared to a standard CCD manufacturing process. This can lead to lag between frames due to less than ideal charge transfer efficiency. Significantly, however, the pixel sensor element 200 of the first aspect reduces the amount of lag as compared to the existing system (FIG. 1) by reducing the number of CCD storage cells that each charge has to be shifted through.

In one example, the photodetector 201 operates at a frame rate of up to 5 million frames per second, and the pixel sensor element 200 is able to capture 180 frames of pixel data. The pixel data is then read-out at a rate limited by the read-out circuitry of the imaging device in which the pixel sensor element is installed which may be approximately 1100 frames per second.

It will be appreciated that the first aspect does not require four storage arrays 205. Instead, any number N, where N is two or more, of storage arrays 205, signal transfer regions 203, and signal read-out regions 219 may be provided as appropriate by the skilled person. In these arrangements, the input shift registers 207 will be required to shift signals at 1/N the frame rate. The number N being 4 has been identified as a particularly advantageous arrangement in terms of reduced signal transfer rates, and because it can be used to concatenate pairs of adjacent storage arrays 205 from different pixel sensor elements 200 as discussed in greater detail below.

It will further be appreciated that the first aspect does not require the storage arrays 205 to be positioned in different quadrants of the pixel sensor element 200. Instead, any arrangement of the storage arrays 205 may be used as appropriate by the skilled person.

It will further be appreciated that the first aspect does not require the input shift registers 207 and output shift registers 215 to have 5 storage cells arranged in columns. Instead, any number M, where M is one or more, of storage cells may be provided. In addition, the first aspect does not require the storage shift registers 211 to have 5 rows of 7 storage cells. Instead, M rows of any number P, where P is one or more, of storage cells may be provided. The numbers M and P may be selected by the skilled person so as to enable the storage arrays 205 to be conveniently fitted in the pixel sensor element 200, taking into account geometry constraint in the production process. A larger pixel area will mean that the numbers M and P can be selected to be higher.

Figure 12:
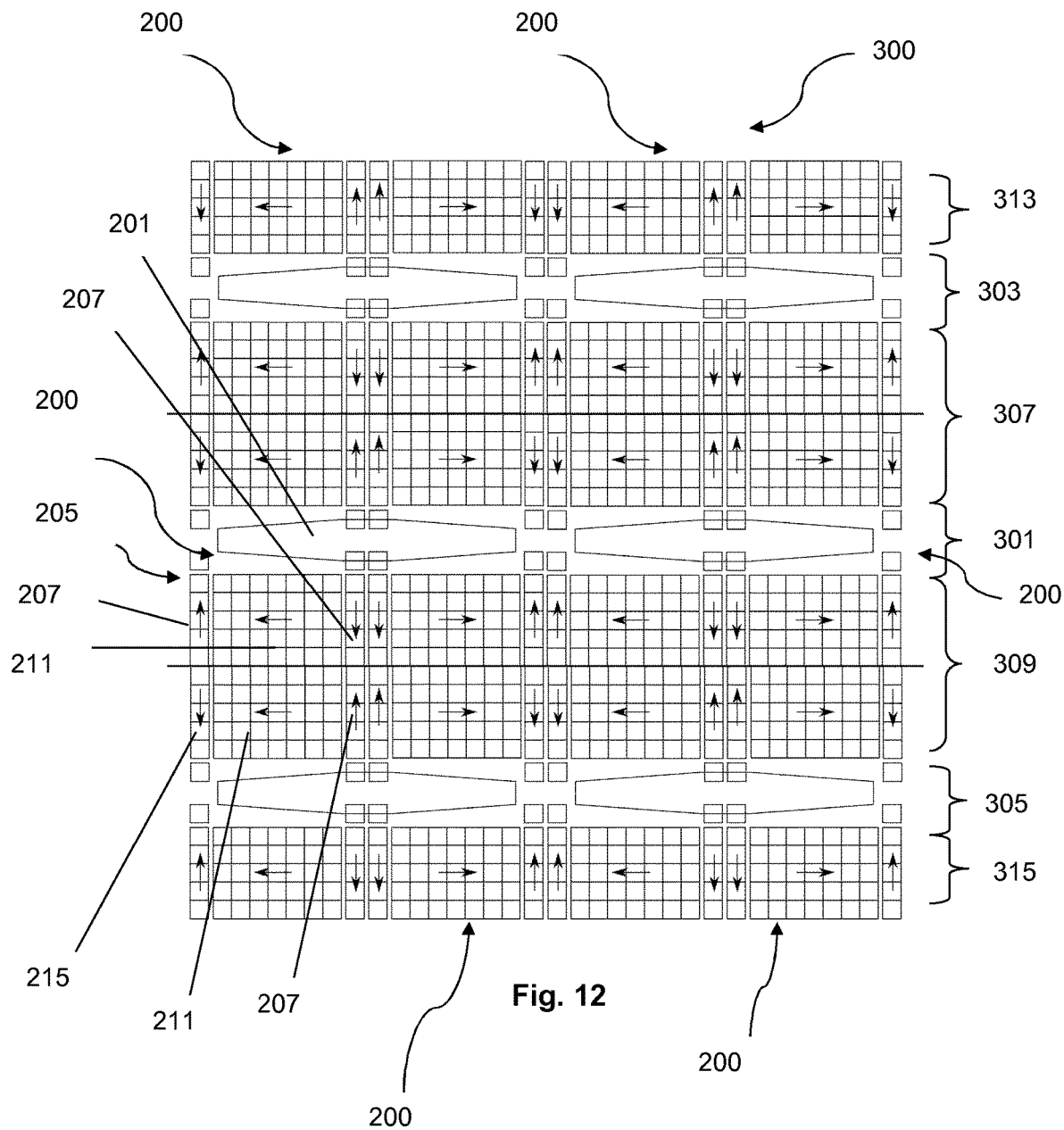
FIG. 12 shows a schematic diagram of an image sensor according to the second aspect.

Referring to FIG. 12, there is shown an image sensor according to the second aspect and indicated generally by the reference numeral 300. The image sensor 300 has 6 pixel sensor elements 200 according to the first aspect arranged in an array of rows and columns. There are three rows of pixel sensor elements 200 arranged in two columns. This arrangement can also be considered as forming three rows of photodetectors 201—a central row 301, an upper row 303 and a lower row 305. Storage arrays 205 are arranged in pairs of adjacent rows between the photodetectors 201. There is an upper pair of adjacent rows 307 between the upper 303 and central 301 rows of photodetectors 201 and there is a lower pair of adjacent rows 309 between the central 301 and lower 303 rows of photodetectors 201. The upper-most 313 and lower-most 315 rows of the storage arrays 205 are not arranged between rows 301, 303 and 305 of the photodetectors 201 and instead define the boundary of the image sensor 300.

The image sensor 300 is used to capture an image, such that each pixel sensor element 200 captures pixel data for one pixel of the generated image.

In a burst-mode operation, each pixel sensor element 200 may be driven, at the same time, to capture 180 frames of pixel data.

It will be appreciated that the image sensor 300 of FIG. 12 is just an example with a very small number of pixel sensor elements 200. Useful image sensors 300 would be expected to have in the order of at least 0.5 million pixel sensor elements 200 arranged in an array of rows and columns. The principles of operation are the same as outlined in FIG. 12.

Figure 13:
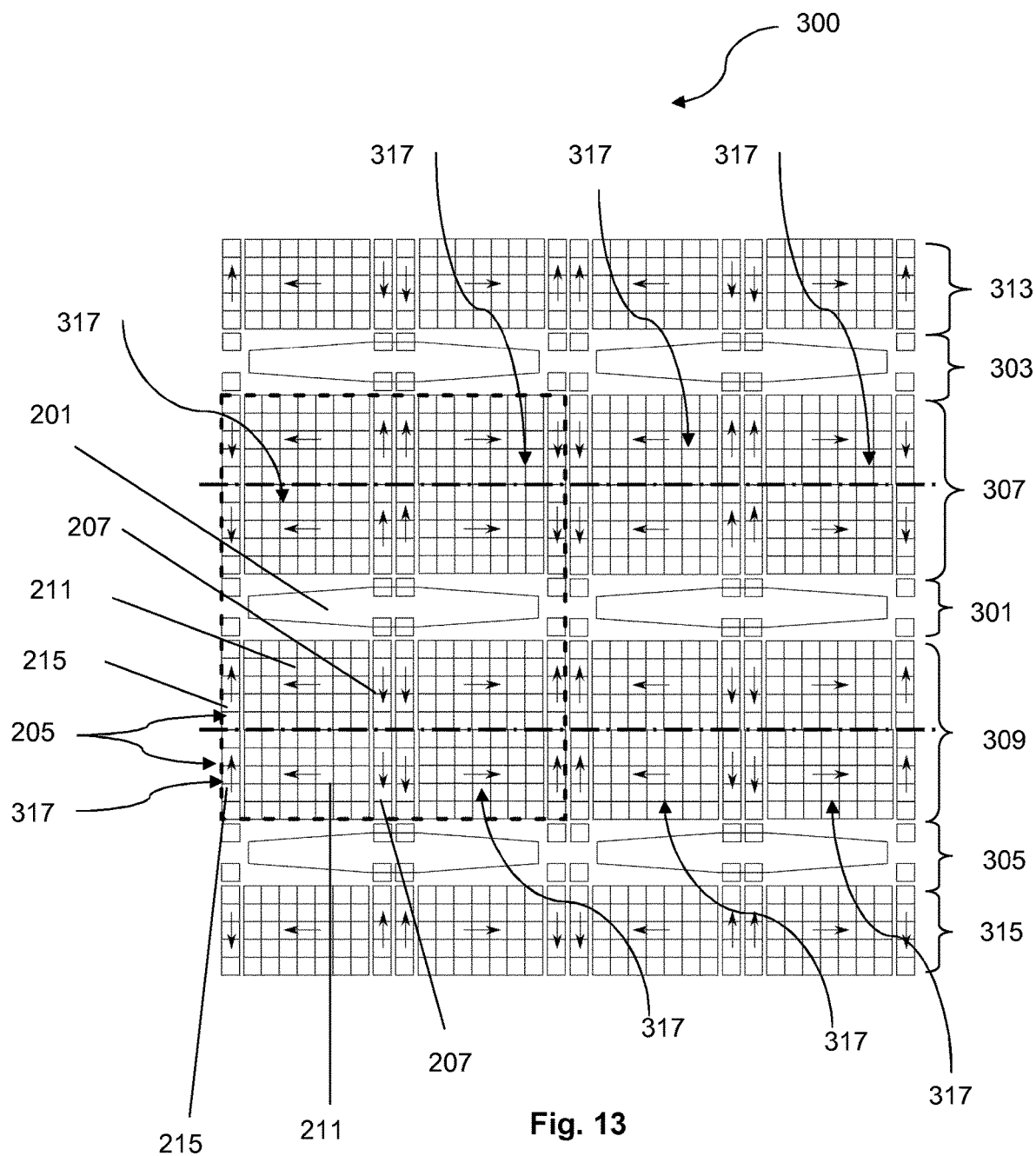
FIG. 13 shows another schematic diagram of an image sensor according to the second aspect.

Referring to FIG. 13, there is shown an arrangement of the image sensor 300 of FIG. 12 where some of the input shift registers 207 and output shift registers 215 are driven in different directions to that of FIG. 12. Here, each storage array 205 of a first of the upper pair of adjacent rows 307 is operably connected to an adjacent storage array 205 of a second of the upper pair of adjacent rows 307 to form a paired storage array 317. In addition, each storage array 205 of a first of the lower pair of adjacent rows 309 is operably connected to an adjacent storage array 205 of a second of the lower pair of adjacent rows 309 to form a paired storage array 317. In this way, there are eight paired storage arrays 317 arranged between the three rows 301, 303, 305 of photodetectors 301. In each paired storage array 317, the input shift registers 207 of the two storage arrays 205 are operably connected to one another and the output shift registers 215 of the two storage arrays 205 are operably connected to one another.

In the arrangement as shown in FIG. 13, for each paired storage array 317, the input shift registers 207 are driven to transfer signals in a first direction, and the output shift registers 215 are driven to transfer signals in a second direction opposite to the first direction. This means that the signal transfer of half of the input shift registers 207 and output shift registers 215 has been reversed as compared to the arrangement of FIG. 12. Each paired storage array 317 is therefore arranged to act as a single storage array having an input shift register and an output shift register with 10 storage cells arranged in a vertical column and a storage shift register with 10 of rows of storage cells, with each row having 7 storage cells. In this way, the paired storage arrays 317 can be used to increase the storage capacity of some of the pixel sensor elements 200 in the image sensor 300.

In the arrangement of FIG. 13, the photodetectors 201 of the central row 301 are activated to generate signals in response to light while the photodetectors 201 of the upper row 303 and the lower row 305 are not activated. For each paired storage array 317, the input shift registers 207 associated with the photodetectors 201 of the upper row 303 and the lower row 305 are driven in the reverse direction to the arrangement shown in FIG. 12. This means that these input shift registers 207 associated with the photodetectors 201 of the upper row 303 and the lower row 305 are arranged to receive signals from the input shift registers 207 associated with the photodetectors 201 of the central row 301. The output shift registers 215 associated with the photodetectors 201 of the upper row 303 and the lower row 305 are also driven in the reverse direction to the arrangement shown in FIG. 12. The means that the output shift registers 215 associated with the photodetectors 201 of the upper row 303 and the lower row 305 are arranged to transfer signals to the output shift registers 215 associated with the photodetectors 201 of the central row 301. This transfer of signals is shown by the arrows in FIG. 13.

In this arrangement, the paired storage arrays 317 acts as increased storage capacity for the photodetectors 201 of the central row 301. Each photodetector 201 of the central row therefore has four paired storage arrays 317 arranged in different quadrants around the photodetector 201. Each paired storage array 317 has 90 storage cells and so is able to store 90 signals representing 90 frames of pixel data. In total, 360 storage cells are provided for the paired storage array 317 to store 360 signals for each activated photodetector 201. Therefore, the storage capacity for the photodetectors 201 of the central row 301 is doubled. The signal transfer rate of the input shift registers 207 and output shift registers 215 is unchanged, but the signal transfer rate of the storage shift registers 211 of the paired storage arrays 317 is halved to 1/40 times the frame rate. This is at the expensive of image resolution, as the rows 303 and 305 of photodetectors 201 are not activated.

It will be appreciated that the image sensor 300 of FIG. 13 is just an example with a very small number of pixel sensor elements 200. Useful image sensors 300 would be expected to have in the order of 0.5 million pixel sensor elements 200 arranged in an array of rows and columns. The principles of operation are the same as outlined in FIG. 13.

Figure 14:
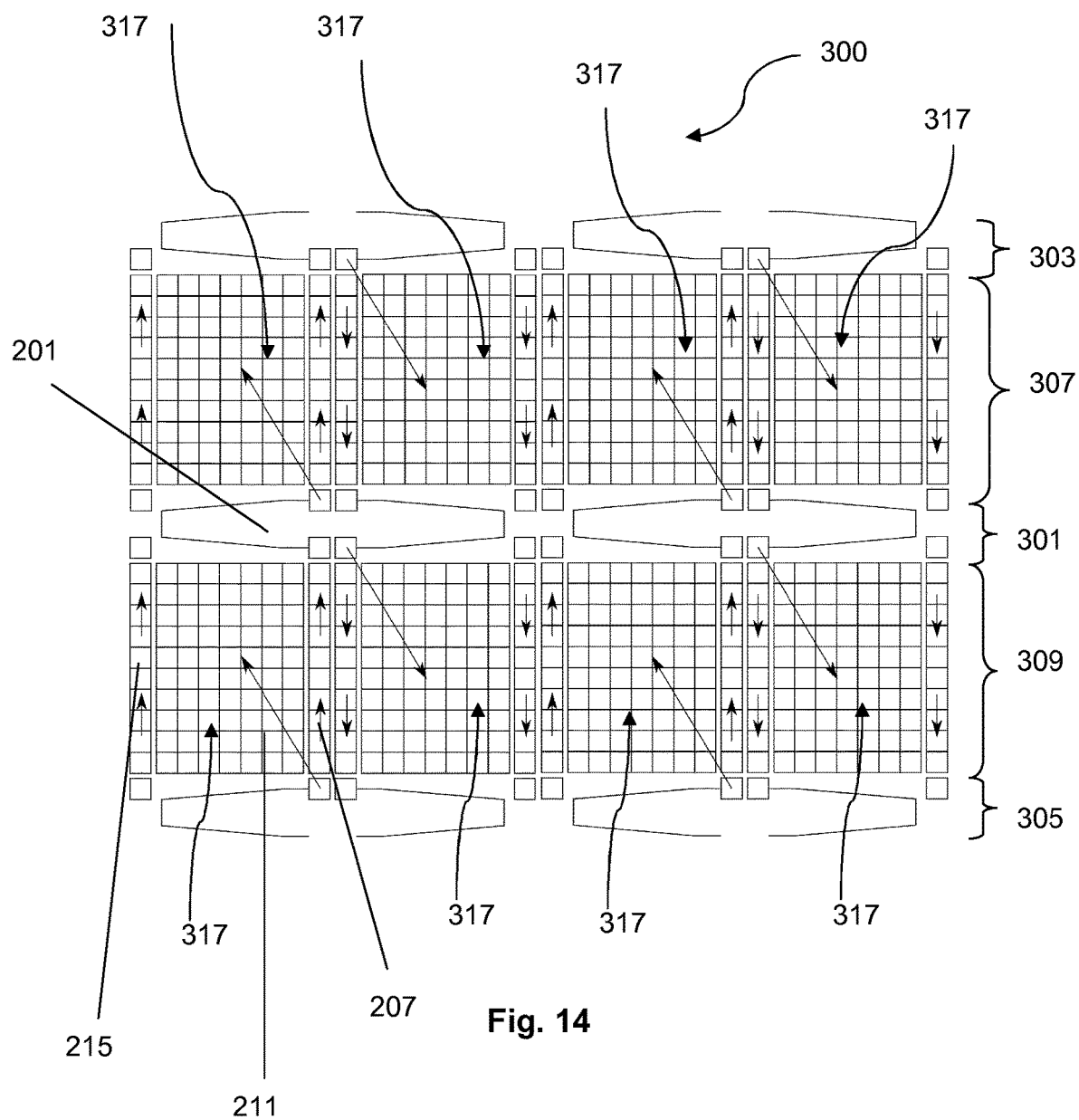
FIG. 14 shows yet another schematic diagram of an image sensor according to the second aspect.

Referring to FIG. 14, there is shown another arrangement of the image sensor 300 of FIG. 12 where some of the input shift registers 207 and output shift registers 215 are driven in different directions to that of FIGS. 12 and 13. Here, eight paired storage arrays 317 are formed between the rows 301, 303, and 305 of photodetectors 201. Each paired storage array 317 of the pair of adjacent rows 307 is driven in a different direction to the driving direction of adjacent paired storage arrays 317 in the pair of adjacent rows 307. In addition, each paired storage array 317 of the pair of adjacent rows 309 is driven in a different direction to the driving direction of adjacent paired storage arrays 317 in the pair of adjacent rows 309. Therefore, the input shift registers 207 and output shift registers 215 of adjacent paired storage arrays 317 are driven in opposite directions to one another.

Unlike the arrangement of FIG. 13, all of the photodetectors 201 of the rows 301, 303 and 305 are activated to generate signals in response to light. Due to the way the paired storage arrays 317 are driven as outlined above, the photodetectors 201 in central row 301 have two paired storage arrays 317 arranged to store signals generated by the photodetectors 201. These two paired storage arrays 317 are arranged in the upper-left and lower-right quadrants around the photodetectors 201. The photodetectors 201 in upper row 303 have two paired storage arrays 317 arranged to store signals generated by the photodetectors 201. These two paired storage arrays 317 are arranged in the upper-left (not shown) and lower-right quadrants around the photodetectors 201. The photodetectors 201 in lower row 305 have two paired storage arrays 317 arranged to store signals generated by the photodetectors 201. These two paired storage arrays 317 are arranged in the upper-left and lower-right (not shown) quadrants around the photodetectors 201.

In this arrangement, two transfer regions 203 are operated to transfer signals for each photodetector 201. Therefore, the signal transfer rates for the input shift registers 207 are ½ the frame rate. This arrangement generates only half the power saving of the driving arrangements of FIGS. 12 and 13. However, in this each arrangement, each signal goes through the same number of shifts to get from the photodetector to the read-out region. That is, there the signal must be shifted through 18 storage cells of the paired storage array 317. This arrangement means that, for each signal, the lag is in the same direction and of the same magnitude. Because from signal-to-signal to the lag is more consistent, it is easier to correct. In addition, because only two paired storage arrays 317 are alternately operating for each photodetector 201, the lag is 2-frame lag rather than 4-frame lag.

In a modified driving arrangement, one of the paired storage arrays 317 could be driven to first store signals representing 90 frames of pixel data, before driving the other of the paired storage arrays 317 to store signals representing the remaining 90 frames of pixel data. This arrangement would reduce the lag to 1-frame lag and not 2-frame lag. However, this arrangement requires a more complicated driving method. Half of the input shift registers 207 will be driven to shift signals at the frame rate, which can increase the heat generation rate, the other half of the input shift registers 207 will remain idle.

It will be appreciated that the image sensor 300 of FIG. 14 is just an example with a very small number of pixel sensor elements 200. Useful image sensors 300 would be expected to have in the order of 0.5 million pixel sensor elements 200 arranged in an array of rows and columns. The principles of operation are the same as outlined in FIG. 14.

It will also be appreciated that the structure of the image sensor 300 for each of the arrangement shown in FIGS. 12, 13 and 14 may be identical with the only difference being the direction in which some of the input shift registers 207 and output shift registers 215 transfer signals. In other words, a single image sensor 300 may be able to operate in the ways shown in FIGS. 12, 13 and 14 simply by changing the direction in which some of the input shift registers 207 and the output shift registers 215 are driven. This highlights the versatility of the architecture of the pixel sensor element 200.

Figure 15:
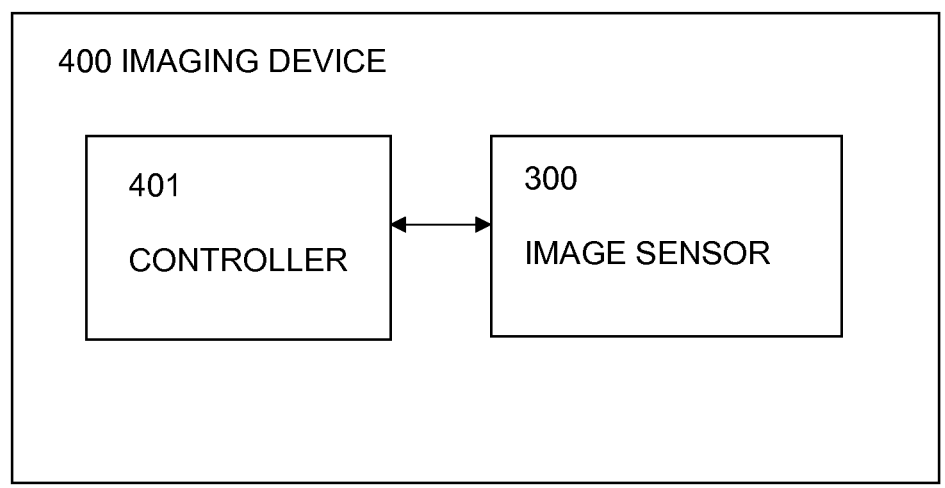
FIG. 15 shows a schematic diagram of an imaging device according to the third aspect.

Referring to FIG. 15, there is shown an imaging device according to the third aspect and indicated generally by the reference numeral 400. The imaging device 400 comprises image sensor 300 and a controller 401. The controller 401 is operable to apply drive signals to the photodetectors 201 (FIG. 2) and the storage cells of the pixel sensor elements 200 (FIG. 2). In this way, the controller 401 is operable to control the frame rate of the photodetectors 201 and the signal transfer rate of the storage cells. For example, the controller is operable to control the storage cells of the input and output shift registers 207, 215 (FIG. 2) to transfer signals at ¼ the frame rate, and control the storage cells of the storage shift registers 211 (FIG. 2) to transfer signals at ¹⁄₂₀ the frame rate. The controller 401 is further operable to control the direction in which the input shift registers 207 and the output shift registers 215 transfer signals. For example, the controller 401 is operable to control the direction of signal transfer for the input shift registers 207 and output shift registers 215 to achieve the driving arrangements shown in FIGS. 12, 13 and 14.

In FIG. 14 the controller 401 is shown as a separate component of the imaging device 400. In other examples, the controller 401 is integrated into the image sensor 300, or a plurality of controllers 401 are provided with each controller 401 being integrated into one of the pixel sensor elements 200.

In order to achieve the driving arrangement shown in FIG. 12, the controller 401 drives the input shift registers 207 and output shift registers 215 of every pixel sensor element 200 in the same way. That is, the controller 401 drives each input shift register 207 to transfer signals in the direction away from the signal transfer region 203 (FIG. 2) associated with the input shift register 207. In addition, the controller 401 drives each output shift register 215 to transfer signals in the direction towards the signal read-out region 219 (FIG. 2) associated with the output shift register 215.

In order to achieve the driving arrangement shown in FIG. 13, the controller 401 reverses the driving direction for the input shift registers 207 and output shift registers 215 of half of the pixel sensor elements 200. In particular, the controller 401 reverses the driving direction of alternate rows of pixel sensor elements 200 in the image sensor 300. For the rows of pixel sensor elements that have their driving directions reversed, the photodetectors 201 are not activated to generate signals in response to light. By this arrangement, the input shift registers 207 for every other row of pixel sensor elements 200 in the image sensor 300, transfer signals towards the signal transfer regions 203 associated with the input shift registers 207. In addition, the output shift registers 215 for every other row of pixel sensor elements 200 in the image sensor 300 transfer their signals away from the signal read-out regions 219 associated with the output shift registers 215.

In order to achieve the driving arrangement shown in FIG. 14, the controller 401 reverse the driving direction for the input shift registers 207 and output shift registers 215 of half of the pixel sensor elements 200. The controller 401 is operated to drive each storage array 205 such that the driving direction of the storage array 205 is different to that of adjacent storage arrays 205. In this arrangement, all of the photodetectors 201 are activated to generate signals in response to light.

Figure 16:
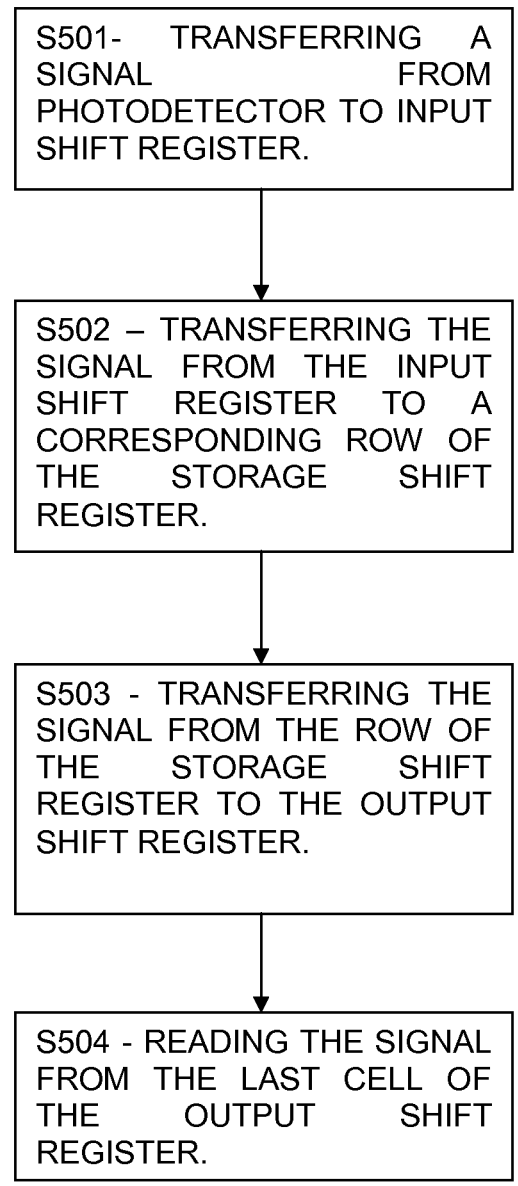
FIG. 16 shows a flow diagram of a method according to the fifth aspect.

Referring to FIG. 16, there is shown a method of operating a pixel sensor element 200 (FIG. 2) according to a fifth aspect.

For each of the four storage arrays 205 (FIG. 2), the method comprise the following steps.

At step S501, the signal transfer region 203 (FIG. 2) is induced to transfer a signal from the photodetector 201 (FIG. 2) to the first cell 210 (FIG. 2) of the input shift register 207 (FIG. 2). As a result, a signal representing a frame of pixel data is transferred from the photodetector 201 to the input shift register 207 as shown in FIGS. 3 to 7 and 10 to 11. Any signals previously stored in the storage cells of the input shift register 207 are transferred to the next storage cell along the input shift register 207.

At step S502, for at least one cell of the input shift register 207, the signal from the cell of the input shift register 207 is transferred to a first cell of a corresponding row of the storage shift register 211 (FIG. 2). As a result, the signal representing the frame of pixel data is transferred from the input shift register 207 to the storage shift register 211 as shown in FIGS. 8 and 9. For each row of the storage shift register 211, any signals previously stored in the storage cells of the storage shift register 211 are transferred to the next storage cell in the row of the storage shift register 211.

At step S503, for at least one cell of the storage shift register 211, the signal from a last cell of the row of the storage shift register 211 is transferred to a corresponding cell of the output shift register 215 (FIG. 2). As a result, the signal representing the frame of pixel data is transferred from the storage shift register 211 to the output shift register 215.

At step S504, the signal read-out region 219 (FIG. 2) is induced to read the signal from the last cell 217 (FIG. 2) of the output shift register 215. As a result, the signal representing the frame of pixel data is read-out from the pixel sensor element 200 and may be used to generate an image.

In the burst-mode operation as shown in FIGS. 3 to 11, step S501 is performed until the input shift register 207 is full, and accordingly step S502 is performed in response to the input shift register 207 being full. In a continuous-mode operation, this is not required, and as such it is not required to wait for the input shift register 207 to be full before signals are transferred.

In the burst-mode operation as shown in FIGS. 3 to 11, step 502 is performed until the storage shift register 211 is full, and accordingly step S503 is performed in response to the storage shift register 211 being full. In a continuous-mode operation, this is not required, and as such it is not required to wait for the storage shift register 211 to be full before signals are transferred.

In the burst-mode operation as shown in FIGS. 3 to 11, step 504 in one example is only performed once the storage arrays 205 are full, and then step S504 is performed repeatedly until the storage arrays 205 are empty. In other examples, the read-out regions 219 are driven for each shift of the input/output shift registers 207, 215 to minimise the accumulation of dark current in the output shift registers 215. In other words, the read-out regions 219 are driven at 1/N the frame rate. In a continuous-mode operation, this is not required, and as such it is not required to wait for the storage arrays 205 to be full before signals are read-out.

Step S501 is performed sequentially for each of the four storage arrays 205, such that the signals are transferred to the first cell 210 of the input shift register 207 at ¼ the frame rate. Step S504 is also performed sequentially for each of the four storage arrays 205.

Steps S502 is performed substantially simultaneously for each of the four storage arrays 205. Step S503 is also performed substantially simultaneously for each of the four storage arrays 205. Steps S501 and S502 are performed at ½0 times the frame rate.

Figure 17:
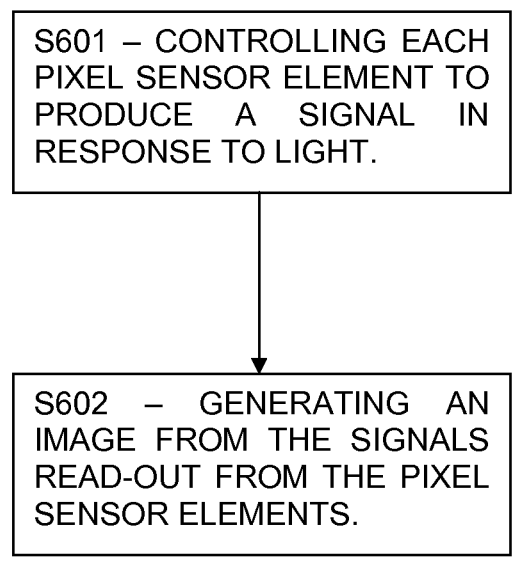
FIG. 17 shows a flow diagram of a method according to the sixth aspect.

Referring to FIG. 17, there is shown a method of operating the image sensor 300 as shown in FIG. 12 and according to the sixth aspect.

At step S601 the method according to the fifth aspect is performed for each pixel sensor element 200 (FIG. 2) of the image sensor 300 (FIG. 12).

Figure 18:
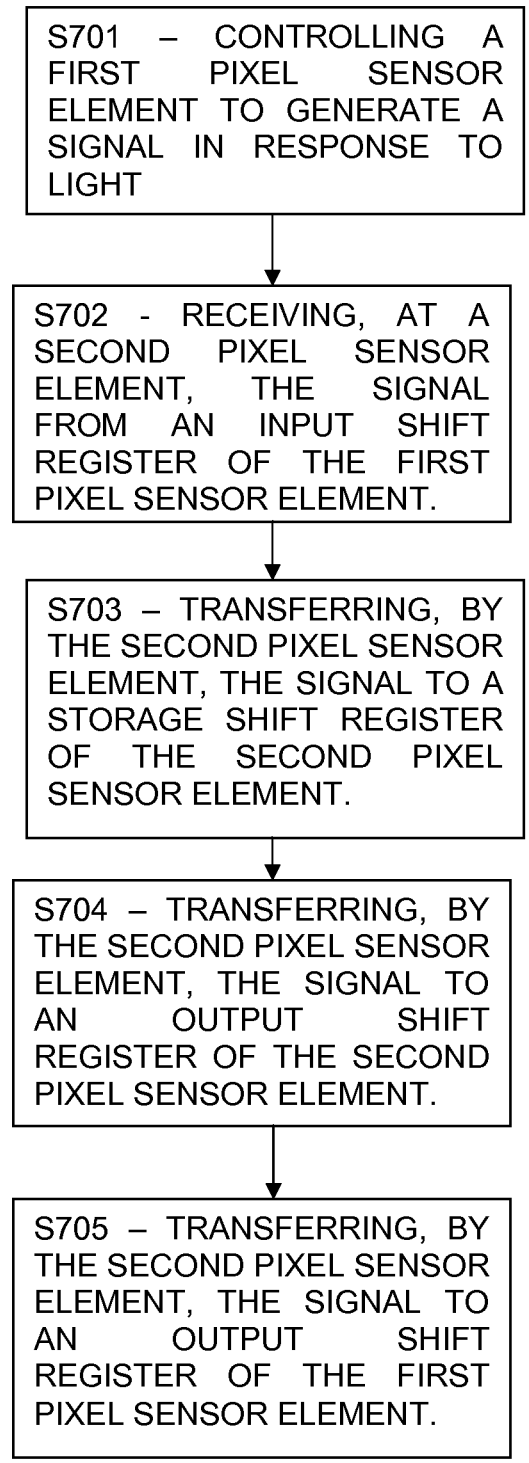
FIG. 18 shows a flow diagram of a method according to the seventh aspect.

At step S602 the resultant signals provided by the signal read-out regions 219 (FIG. 2) of each pixel sensor element 200 are used to generate an image. In particular, the signals read by each signal read-out region 219 are provided to a processing unit (not shown), which processes the signal data to generate an image. Referring to FIG. 18, there is shown a method of operating the image sensor 300 as shown in FIG. 13 and according to the seventh aspect. The method is performed for each paired storage array 317 (FIG. 13) and comprises the following steps.

At step S701, a pixel sensor element 200 (FIG. 2) including a first storage array 205 (FIG. 2) of the paired storage array 317 is controlled to perform the according to the fifth aspect.

The pixel sensor element 200 including a second storage array 205 of the paired storage array 317 is controlled to perform the following steps for the second storage array 205.

At step S702, the input shift register 207 (FIG. 2) receives a signal from a last cell of the input shift register 207 of the first storage array 205.

At step S703, for at least one cell of the input shift register 207, the signal is transferred from the cell of the input shift register 207 to a first cell of a corresponding row of the storage shift register 211 (FIG. 2)

At step S704, for at least one row of the storage shift register 211, the signals is transferred from a last cell of the row of the storage shift register 211 to a corresponding cell of the output shift register 215 (FIG. 2).

At step S705, the signal is transferred from the output shift register 215 to a first cell of the output shift register 215 of the first storage array 205.

The pixel sensor element 200 including the first storage array 205 is therefore arranged to control the input shift register 207 of the first storage array 205 to shift signals in a first direction away from the signal transfer region 203 (FIG. 2) associated with the input shift register 207. The pixel sensor element 200 is further arranged to control the output shift register 215 of the first storage array 205 to shift signals in a second direction towards the signal read-out region 219 (FIG. 2) associated with the output shift register 215.

The pixel sensor element 200 including the second storage array 205 is therefore arranged to control the input shift register 207 of the second storage array 205 to shift signals in the first direction. That is, towards the signal transfer region 203 associated with the input shift register 207. The pixel sensor element 200 may be further arranged to control the output shift register 215 of the second storage array 205 to shift signals in the second direction. That is, away from the signal read-out region 219 associated with the output shift register 205.

In this way, the pixel sensor element 200 including the second storage array 205 is controlled to reverse the direction in which the input shift register 207 and the output shift register 215 of the second storage array 205 transfer signals.

Step S702 is performed until the input shift register 207 is full, and accordingly step S703 is performed in response to the input shift register 207 being full.

Step S703 is performed until the storage shift register 211 is full, and accordingly step S704 is performed in response to the storage shift register 211 being full.

Step S704 is performed until the output shift register 215 is empty.

The method according to the seventh aspect may also be performed to achieve the driving arrangement shown in FIG. 14.

Figure 19:
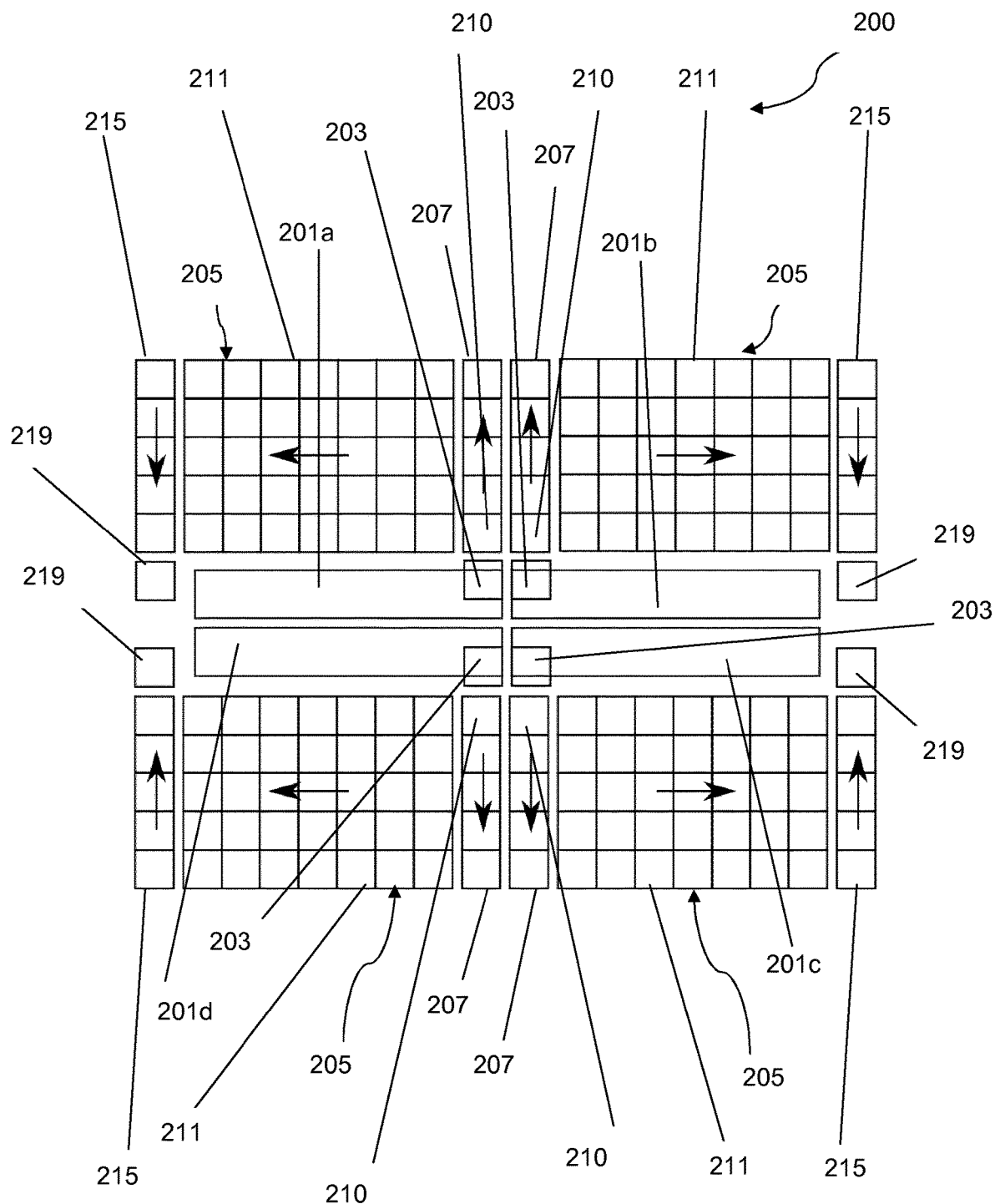
FIG. 19 shows another schematic diagram of a pixel sensor element according to the first aspect.

Referring to FIG. 19, there is shown another arrangement of the pixel sensor element 200. In this arrangement, the photodetector 201 is a photodetector region comprising 4 photodetectors 201a, 201b, 201c, 201d. The 4 photodetectors 201a, 201b, 201c, 201d are arranged mutually adjacent to one another in an array with 2 rows and 2 columns. The 4 photodetectors 201a, 201b, 201c, 201d while being mutually adjacent to one another, are separated from one another to permit independent signal generation.

The storage arrays 205 are positioned in different quadrants of the pixel sensor element 200. Each storage array 205 comprises an input shift register 207 having 5 storage cells arranged in a vertical column, a storage shift register 211 having 5 horizontal rows of storage cells with each row having 7 storage cells, and an output shift register 215 having 5 storage cells arranged in a vertical column. The pixel sensor element 200 further has 4 independently driveable signal transfer regions 203, each arranged to transfer a signal from the photodetector 201 to a first cell 210 of one of the input shift registers 207. In addition, the pixel sensor element 200 has 4 signal read-out regions 219, each arranged to read-out the signal from a last cell of one of the output shift registers 215.

Each of the 4 photodetectors 201a, 201b, 201c, 201d, is associated with one of the storage elements 205. This means that each signal transfer region 203 is inducible to transfer a signal from a different one of the 4 photodetectors 201a, 201b, 201c, 201d. In operation, the 4 signal transfer regions 203 may be sequentially induced to transfer signals from the photodetectors 201a, 201b, 201c, 201d.

The pixel sensor element 200 is able to operate in a burst-mode where signals representing consecutive frames of pixel data are generated and stored in the storage assembly. This enables the pixel sensor element 200 to capture signals representing 180 (the total number of storage cells in the storage assembly) consecutive frames of pixel data at a high frame rate.

In a first step of an example burst-mode operation, the photodetector 201a of the upper left quadrant generates a signal in response to light, and the signal transfer region 203 of the upper-left quadrant is induced to transfer the signal to the first cell 210 of the input shift register 207 of the upper-left quadrant. In this way, a signal representing a first frame of pixel data is captured.

In second step of an example burst-mode operation, the photodetector 201b of the upper right quadrant generates a signal in response to light, and the signal transfer region 203 of the upper-right quadrant is induced to transfer the signal to the first cell 210 of the input shift register 207 of the upper-right quadrant. In this way, a signal representing a second frame of pixel data is captured.

In a third step of an example burst-mode operation, the photodetector 201c of the lower right quadrant generates a signal in response to light, and the signal transfer region 203 of the lower-right quadrant is induced to transfer the signal to the first cell 210 of the input shift register 207 of the lower-right quadrant. In this way, a signal representing a third frame of pixel data is captured.

In a fourth step of an example burst-mode operation, the photodetector 201d of the lower-left quadrant has generated a signal in response to light, and the signal transfer region 203 of the lower-left quadrant is induced to transfer the signal to the first cell 210 of the input shift register 207 of the lower-left quadrant. In this way, a signal representing a fourth frame of pixel data is captured.

It will be appreciated that these four steps of the burst-mode operation are analogous to the four steps of the burst-mode operation as shown in FIGS. 3-6. The pixel sensor element 200 of this arrangement may also perform similar steps to those as shown in FIGS. 7-11 in the burst-mode operation and as described above. In other words, the storage assembly of the pixel sensor element 200 of the arrangement shown in FIG. 19 operates in the same way as the storage assembly of the pixel sensor element 200 of the arrangement shown in FIG. 2.

It will be appreciated that the pixel sensor element 200 of the arrangement shown in FIG. 19 may be used to form an image sensor similar to the arrangements shown in FIGS. 12 to 14, may be incorporated into an imaging device similar to the arrangements shown in FIG. 15, and may be operated to perform the methods of any of FIGS. 16 to 18 and as described above in relation to the pixel sensor element 200 of the arrangement shown in FIG. 2.

It will be appreciated that numerous modifications to the above described embodiments may be made without departing from the scope of the invention as defined in the appended claims. For example, the photodetector 201 may generate voltage or current signals instead of charge. The number N may be 2. The number M may be 8 and the number P may be 7. The number M may be 7 and the number P may be 5.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

In summary, there is provided a pixel sensor element including a photodetector and a storage assembly having N storage arrays, each having an input shift register and an output shift register each with a number M of storage cells arranged in a column, and a storage shift register with a number M of rows of storage cells, each row comprising a number P of storage cells, arranged for signal transfer from the input shift register to the output shift register. A number N of independently driveable signal transfer regions are each inducable to transfer the signal from the photodetector to a first cell of one of a respective one of the input shift registers (207). A number N of signal read-out regions are each inducable to read the signal from a last cell of a respective one of the output shift registers. N is 2 or more. M is 1 or more. P is 1 or more. Image sensors, imaging devices, storage assemblies, and methods are also provided.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at least some of such features and/or steps are mutually exclusive.

Each feature disclosed in this specification (including any accompanying claims and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A pixel sensor element for generation of a signal from light falling on the pixel sensor element comprising:
   a photodetector arranged to generate a signal in response to light;
   a storage assembly comprising a number N of storage arrays, where N is 2 or more, each storage array comprising: an input shift register and an output shift register each with a number M of storage cells arranged in a column, where M is 1 or more; and a storage shift register with a number M of rows of storage cells, each row comprising a number P of storage cells, where P is 1 or more, arranged for signal transfer from the input shift register to the output shift register; and
   a number N of independently driveable signal transfer regions, each arranged to be inducable to transfer the signal from the photodetector to a first cell of one of a respective one of the input shift registers; and
   a number N of signal read-out regions each arranged to be inducable to read the signal from a last cell of a respective one of the output shift registers,
   wherein the photodetector is a single photodetector and the N signal transfer regions are arranged to be inducable to transfer the signal from the single photodetector.

2. The pixel sensor element as claimed in claim 1, wherein N is 4, the photodetector is positioned in a central region of the pixel sensor element, and the 4 storage arrays are positioned symmetrically around the photodetector.

3. The pixel sensor element as claimed in claim 2, wherein the pixel sensor element is square or rectangular in shape and wherein the 4 storage arrays are positioned in different quadrants of the pixel sensor element.

4. The pixel sensor element as claimed in claim 3 wherein the photodetector is arranged to generate charge in response to light, wherein the input shift register, the output shift register, and the storage shift register are charge-coupled device, (CCD) shift registers, and wherein the signal read-out regions are arranged to convert charge read from the output shift registers to generate a voltage or current signal.

5. An image sensor comprising a plurality of pixel sensor elements as claimed in, claim 4 the pixel sensor elements being arranged in an array of rows and columns with the photodetectors arranged in rows and comprising storage arrays arranged in pairs of adjacent rows between the rows of photodetectors.

6. The image sensor as claimed in claim 5 wherein for each pair of adjacent rows of storage arrays, each storage array of a first of the pair of adjacent rows is operably connected to an adjacent storage array of a second of the pair of adjacent rows to form a paired storage array, whereby each paired storage array is arrangeable to act as a single storage array having an input shift register and an output shift register with 2M of storage cells arranged in a column and a storage shift register with 2M of rows of storage cells, each row having P storage cells.

7. The imaging device comprising an image sensor as claimed in claim 5, and a controller operable to apply drive signals to the photodetectors and storage cells of the pixel sensor elements so as to control the frame rate of the photodetectors and the signal transfer rate of the storage cells, wherein the controller is operable to control the storage cells of the input shift registers to transfer signals at 1/N the frame rate of the photodetector, and wherein the controller is operable to control the storage cells of the storage shift registers to transfer signals at 1/(N times M) the frame rate of the photodetector.

8. A method of operating a pixel sensor element according to claim 1, the method comprising, for each storage array:
(i) inducing the signal transfer region to transfer a signal from the photodetector to the first cell of the input shift register;
(ii) for at least one cell of the input shift register, transferring the signal from the cell of the input shift register to a first cell of a corresponding row of the storage shift register;
(iii) for at least one row of the storage shift register, transferring the signal from a last cell of the row of the storage shift register to a corresponding cell of the output shift register;
(iv) inducing the signal read-out region to read the signal from the last cell of the output shift register.

9. The method as claimed in claim 8, wherein (i) is repeated until the input shift register is full, and/or (ii) is performed in response to the input shift register being full.

10. The method as claimed in claim 8, wherein (ii) is performed until the storage shift register is full.

11. The method as claimed in claim 8, wherein the storage arrays are sequentially activated to perform (i) and/or (iv), and/or wherein the storage arrays are substantially simultaneously activated to perform (ii) and/or (iii).

12. The method as claimed in claim 8, wherein (i) is performed at 1/N the frame rate of the photodetector, (ii) and (iii) are performed at 1/(N times M) the frame rate of the photodetector.

13. A method of operating an image sensor according to claim 5, the method comprising:
controlling each of the pixel sensor elements to perform the method of:
(i) inducing the signal transfer region to transfer a signal from the photodetector to the first cell of the input shift register;
(ii) for at least one cell of the input shift register, transferring the signal from the cell of the input shift register to a first cell of a corresponding row of the storage shift register;
(iii) for at least one row of the storage shift register, transferring the signal from a last cell of the row of the storage shift register to a corresponding cell of the output shift register; and
(iv) inducing the signal read-out region to read the signal from the last cell of the output shift register;
using the signals provided by the signal read-out regions of each pixel sensor element to generate an image.

14. A method of operating an image sensor according to claim 6, the method comprising, for each paired storage array:
controlling a pixel sensor element including a first storage array of the paired storage array to perform the method of:
(i) inducing the signal transfer region to transfer a signal from the photodetector to the first cell of the input shift register
(ii) for at least one cell of the input shift register, transferring the signal from the cell of the input shift register to a first cell of a corresponding row of the storage shift register
(iii) for at least one row of the storage shift register, transferring the signal from a last cell of the row of the storage shift register to a corresponding cell of the output shift register; and
(iv) inducing the signal read-out region to read the signal from the last cell of the output shift register; and
(v) receive at the input shift register, a signal from a last cell of the input shift register of the first storage array;
(vi) for at least one cell of the input shift register, transfer the signal from the cell of the input shift register to a first cell of a corresponding row of the storage shift register;
(vii) for at least one row of the storage shift register, transfer the signal from a last cell of the row of the storage shift register to a corresponding cell of the output shift register; and
(viii) transfer the signal from the output shift register to a first cell of the output shift register of the first storage array.

15. The method as claimed in claim 8, wherein (iii) is performed in response to the storage shift register being full.

* * * * *